(12) United States Patent
Selander et al.

(10) Patent No.: US 11,831,622 B2
(45) Date of Patent: Nov. 28, 2023

(54) SECURITY FOR DISTRIBUTED NETWORKING

(71) Applicant: Telefonaktiebolaget LM Ericsson (publ), Stockholm (SE)

(72) Inventors: Göran Selander, Bromma (SE); Nicolae Paladi, Sollentuna (SE); Marco Tiloca, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 229 days.

(21) Appl. No.: 17/423,162

(22) PCT Filed: Jan. 22, 2019

(86) PCT No.: PCT/EP2019/051456
§ 371 (c)(1),
(2) Date: Jul. 15, 2021

(87) PCT Pub. No.: WO2020/151809
PCT Pub. Date: Jul. 30, 2020

(65) Prior Publication Data
US 2022/0150227 A1    May 12, 2022

(51) Int. Cl.
*H04L 9/40*    (2022.01)

(52) U.S. Cl.
CPC ........ *H04L 63/0435* (2013.01); *H04L 63/062* (2013.01); *H04L 63/166* (2013.01)

(58) Field of Classification Search
CPC .. H04L 63/0435; H04L 63/062; H04L 63/166
See application file for complete search history.

(56) References Cited

U.S. PATENT DOCUMENTS

| 8,225,085 B2 * | 7/2012 | Karandikar | ........... H04L 63/166 |
| | | | 713/153 |
| 8,266,452 B2 * | 9/2012 | Dunn | .................... H04L 63/045 |
| | | | 713/193 |

(Continued)

FOREIGN PATENT DOCUMENTS

| CN | 104780069 A | 7/2015 |
| WO | 2015002581 A1 | 1/2015 |
| WO | 2018013925 A1 | 1/2018 |

OTHER PUBLICATIONS

International Search Report and Written Opinion dated Oct. 9, 2019 for International Application No. PCT/EP2019/051456 filed Jan. 22, 2019, consisting of 13-pages.

(Continued)

*Primary Examiner* — Yonas A Bayou
(74) *Attorney, Agent, or Firm* — Christopher & Weisberg, P.A.

(57) ABSTRACT

There is provided a method of operating a network controller for enabling secure communication between network endpoints in a distributed network, as well as a network controller and a network switch and a method of operating a network switch. The network controller has a secure channel with each of the network endpoints. The network controller is providing, in connection with establishment of a network flow for communication between the network endpoints, symmetric keying material associated with and valid only for that network flow. The network controller is further enabling provisioning of the symmetric keying material to the network endpoints for allowing cryptographically secure communication between the network endpoints on a per-flow basis.

18 Claims, 20 Drawing Sheets

(56) References Cited

U.S. PATENT DOCUMENTS

| | | | |
|---|---|---|---|
| 8,478,986 B2* | 7/2013 | Merugu | H04L 63/0428 713/153 |
| 8,782,393 B1* | 7/2014 | Rothstein | H04L 63/0281 726/13 |
| 10,313,397 B2* | 6/2019 | Komu | H04L 63/20 |
| 11,563,773 B2* | 1/2023 | Mozumdar | H04L 9/0891 |
| 11,606,338 B2* | 3/2023 | Sapp | H04L 63/0478 |
| 2003/0078744 A1* | 4/2003 | Hirn | F02D 41/2096 702/64 |
| 2011/0231649 A1* | 9/2011 | Bollay | H04L 63/0245 713/153 |
| 2011/0231651 A1* | 9/2011 | Bollay | H04L 9/0844 713/153 |
| 2011/0231652 A1* | 9/2011 | Bollay | H04L 63/0245 713/153 |
| 2011/0231653 A1* | 9/2011 | Bollay | H04L 63/0884 713/153 |
| 2016/0036813 A1* | 2/2016 | Wakumoto | H04L 63/0272 713/171 |
| 2017/0222981 A1 | 8/2017 | Srivastav et al. | |
| 2018/0091557 A1 | 3/2018 | Komu et al. | |
| 2018/0375644 A1 | 12/2018 | Karagiannis et al. | |

OTHER PUBLICATIONS

T Dierks et al.; The Transport Layer Security (TLS) Protocol Version 1.2; Network Working Group RFC:5246; The IETF Trust, Aug. 2008, consisting of 104-pages.

E. Rescorla et al.; Datagram Transport Layer Security Version 1.2; Internet Engineering Task Force (IETF) RFC:6347; IETF Trust, Jan. 2012, consisting of 32-pages.

E. Rescorla; The Transport Layer Security (TLS) Protocol Version 1.3; Internet Engineering Task Force (IETF) RFC:8446; The IETF Trust, Aug. 2018, consisting of 160-pages.

E. Rescorla et al.; The Datagram Transport Layer Security (DTLS) Version 1.3 draft-ietf-tls-dtls13-43; TLS, Internet-Draft; IETF Trust, Apr. 30, 2021, consisting of 71-pages.

Microsoft Internet Documentation; Deploy a VM with a securely stored certificate on Azure Stack Hub; Nov. 20, 2020, consisting of 7-pages.

* cited by examiner

METHOD OF OPERATING A NETWORK CONTROLLER

S1 — PROVIDING, IN CONNECTION WITH ESTABLISHMENT OF A NETWORK FLOW FOR COMMUNICATION BETWEEN NETWORK ENDPOINTS, SYMMETRIC KEYING MATERIAL ASSOCIATED WITH AND VALID ONLY FOR THAT NETWORK FLOW

S2 — ENABLING PROVISIONING OF THE SYMMETRIC KEYING MATERIAL TO THE NETWORK ENDPOINTS FOR ALLOWING CRYPTOGRAPHICALLY SECURE COMMUNICATION BETWEEN THE NETWORK ENDPOINTS ON A PER-FLOW BASIS

S2-A: PROVISIONING THE SYMMETRIC KEYING MATERIAL THROUGH THE SECURE CHANNELS FROM THE NETWORK CONTROLLER TO THE NETWORK ENDPOINTS

S2-B: PROVISIONING THE SYMMETRIC KEYING MATERIAL TO THE INITIATING ONE OF THE NETWORK ENDPOINTS, ASSUMING THAT THE RESPONDING ONE OF THE NETWORK ENDPOINTS DERIVES THE SYMMETRIC KEYING MATERIAL BASED ON A SHARED SECRET AND A KEY IDENTIFIER PROVIDED BY THE INITIATING ONE OF THE NETWORK ENDPOINTS

*Fig. 6*

SECURITY FOR DISTRIBUTED NETWORKING

CROSS-REFERENCE TO RELATED APPLICATIONS

This application is a Submission Under 35 U.S.C. § 371 for U.S. National Stage Patent Application of International Application Number: PCT/EP2019/051456, filed Jan. 22, 2019 entitled "SECURITY FOR DISTRIBUTED NETWORKING," the entirety of which is incorporated herein by reference.

TECHNICAL FIELD

The proposed technology generally relates to network communication and distributed networking, and more specifically to a method of operating a network controller for enabling secure communication between network endpoints in a distributed network, and a method of operating a network switch for enabling secure communication between such network endpoints, and a network controller and a network switch, as well as corresponding computer programs and computer-program products.

BACKGROUND

Distributed networking and data communications are nowadays cornerstones of all modern organizations and businesses, where the use of intranets and extranets has allowed organizations to deploy functionality to employees and business partners alike, increasing efficiency and improving communications, and where cloud computing has truly made information available everywhere.

The explosion of mobile devices and content, server virtualization, and the advent of cloud services are among the trends driving the development of advanced networking solutions, e.g. for executing distributed applications, with a multiplicity of functions potentially running asynchronously, across a mix of servers that do not need to share the same facility or location.

For example, Software Defined Networking (SDN) is a technology for networking, data centers and/or cloud computing that facilitates network management and enables programmatically efficient network configuration. SDN is based on disassociating the forwarding process of network packets (data plane) from the routing process (control plane), where the control plane involves one or more SDN controllers which may be considered as the central intelligence of the SDN network.

The SDN architecture thus decouples network control and forwarding functions, and enables network control to become directly programmable and the underlying infrastructure to be abstracted from applications and network services.

For example, the well-known OpenFlow protocol (e.g. for remote communication with network elements for the purpose of determining the path of network packets across network switches) can be used for implementing SDN networks, while other more proprietary solutions also exist.

SDN effectively converts all the major resources provided by servers—compute capacity, memory, storage, and even bandwidth itself—into commodities, allowing a configuration management system to "spin out" a virtual network with only the resources needed to execute a specific workload. The configuration can further be tailored over time, adjusted in response to revelations about that workload's performance. The SDN technology also eliminates the need to design server clusters and data centers around the workloads they host.

Network communication in virtualized and cloud environments is commonly based on the SDN model, allowing for management flexibility and efficient resource utilization.

FIG. 1 is a schematic diagram illustrating an example of a network operating based on the Software Defined Networking, SDN, model. In this model, communication is organized in network flows between network endpoints 100-A and 100-B. The basic network components include the network endpoints 100-A and 100-B, and one or more SDN controllers 200 and one or more SDN switches 300.

With reference to FIG. 1, a flow may be established once a network endpoint 100-A initiates a network communication session (P1). Data plane network elements—such as the SDN switch(es) 300—located on the communication path between the endpoints 100-A and 100-B match the incoming packets against the flow rules and handle the packets according to the matching rule. Unmatched packets may be dropped or up-streamed to a network controller (P2), that may install a matching rule (P3) and establish the respective flow (P1-P4). The SDN controller(s) 200 is the strategic control point in the SDN network, managing flow control and optionally also federating between SDN Controller domains, using common application interfaces, such as OpenFlow and Open Virtual Switch DataBase (OVSDB).

Communication between network endpoints is commonly protected using suites for secure communication, such as Transport Layer Security (TLS) [1][3] and Datagram Transport Layer Security (DTLS) [2][4]. To implement such protocols, network endpoints require cryptographic material, i.e. either shared symmetric keys or asymmetric public/private key pairs and digital certificates.

Currently, the cryptographic material must always be provisioned to the network endpoint prior to establishing network communication. In virtualized and cloud environments, cryptographic material is either provisioned prior to the instantiation of the virtual network endpoint or generated by the endpoint itself and, in the case of digital certificates, signed by a certificate authority [7]. In case of external provisioning of the cryptographic material, this can be done by either the SDN controller 200 itself, or a dedicated orchestrator component 250, in the form of a file injected to the filesystem [6]. The cryptographic material is subsequently used to generate keys used to encrypt the communication between the communicating endpoints. For example, the orchestrator 250 and SDN controller 200 may be considered to be collocated and implemented as one component.

However, the prior art security solutions for distributed networking such as SDN networking suffer from various drawbacks, including security vulnerabilities, computationally and/or resource demanding operations, and/or cumbersome or inflexible key distribution.

SUMMARY

It is an object to provide a method of operating a network controller for enabling secure communication between network endpoints in a distributed network.

It is a specific object to provide a method of operating a network switch for enabling secure communication between network endpoints in a distributed network.

Another object is to provide a network controller configured to enable secure communication between network endpoints in a distributed network.

Yet another object is to provide a network switch configured to enable secure communication between network endpoints in a distributed network.

Still another object is to provide a computer program for operating, when executed, a network controller for enabling secure communication between network endpoints in a distributed network.

It is also an object to provide a computer program for operating, when executed, a network switch for enabling secure communication between network endpoints in a distributed network.

Another object is to provide corresponding computer-program products.

These and other objects are met by embodiments of the proposed technology.

According to a first aspect, there is provided a method of operating a network controller for enabling secure communication between network endpoints in a distributed network. The network controller has a secure channel with each of the network endpoints. According to the method, the network controller is providing, in connection with establishment of a network flow for communication between the network endpoints, symmetric keying material associated with and valid only for that network flow. The network controller is further enabling provisioning of the symmetric keying material to the network endpoints for allowing cryptographically secure communication between the network endpoints on a per-flow basis.

According to a second aspect, there is provided a method of operating a network switch for enabling secure communication between network endpoints in a distributed network. Each of the network endpoints has a secure channel with a network controller, and the network switch has a secure control channel with the network controller. According to the method, the network switch is sending a request to the network controller for initiating establishment of a network flow and for requesting provisioning of symmetric keying material associated with and valid only for that network flow. The network switch is further receiving a flow setup response from the network controller to enable support for the symmetric keying material to be used for cryptographically secure communication between the network endpoints on a per-flow basis.

According to a third aspect, there is provided a network controller configured to enable secure communication between network endpoints in a distributed network. The network controller has a secure channel with each of the network endpoints. The network controller is configured to provide, in connection with establishment of a network flow for communication between the network endpoints, symmetric keying material associated with and valid only for that network flow. The network controller is further configured to enable provisioning of the symmetric keying material to the network endpoints for allowing cryptographically secure communication between the network endpoints on a per-flow basis.

According to a fourth aspect, there is provided a network switch configured to enable secure communication between network endpoints in a distributed network. Each of the network endpoints has a secure channel with a network controller, and the network switch has a secure control channel with the network controller. The network switch is configured to send a request to the network controller for initiating establishment of a network flow and for requesting provisioning of symmetric keying material associated with and valid only for that network flow. The network switch is configured to receive a flow setup response from the network controller to enable support for the symmetric keying material to be used for cryptographically secure communication between the network endpoints on a per-flow basis.

According to a fifth aspect, there is provided a computer program for operating, when executed, a network controller for enabling secure communication between network endpoints in a distributed network. The computer program comprises instructions, which when executed by at least one processor, cause the at least one processor to perform the method according to the first aspect.

According to a sixth aspect, there is provided a computer program for operating, when executed, a network switch for enabling secure communication between network endpoints in a distributed network. The computer program comprises instructions, which when executed by at least one processor, cause the at least one processor to perform the method according to the second aspect.

According to a seventh aspect, there is provided a computer-program product comprising a non-transitory computer-readable medium having stored thereon a computer program according to the fifth or sixth aspect.

In this way, it is possible to ensure cryptographically secure communication between the network endpoints on a per-flow basis.

Symmetric cryptographic security solutions can thus be implemented effectively for distributed networks with considerably improved security, and used on-demand in a fast and flexible manner, reducing computational demands.

By way of example, the distributed network may be a Software Defined Network, SDN, and the network switch may be an SDN switch and the network controller may be an SDN controller.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which:

FIG. 6 is a schematic flow diagram illustrating an example of a method of operating a network controller according to another specific embodiment.

DETAILED DESCRIPTION

Figure 1:
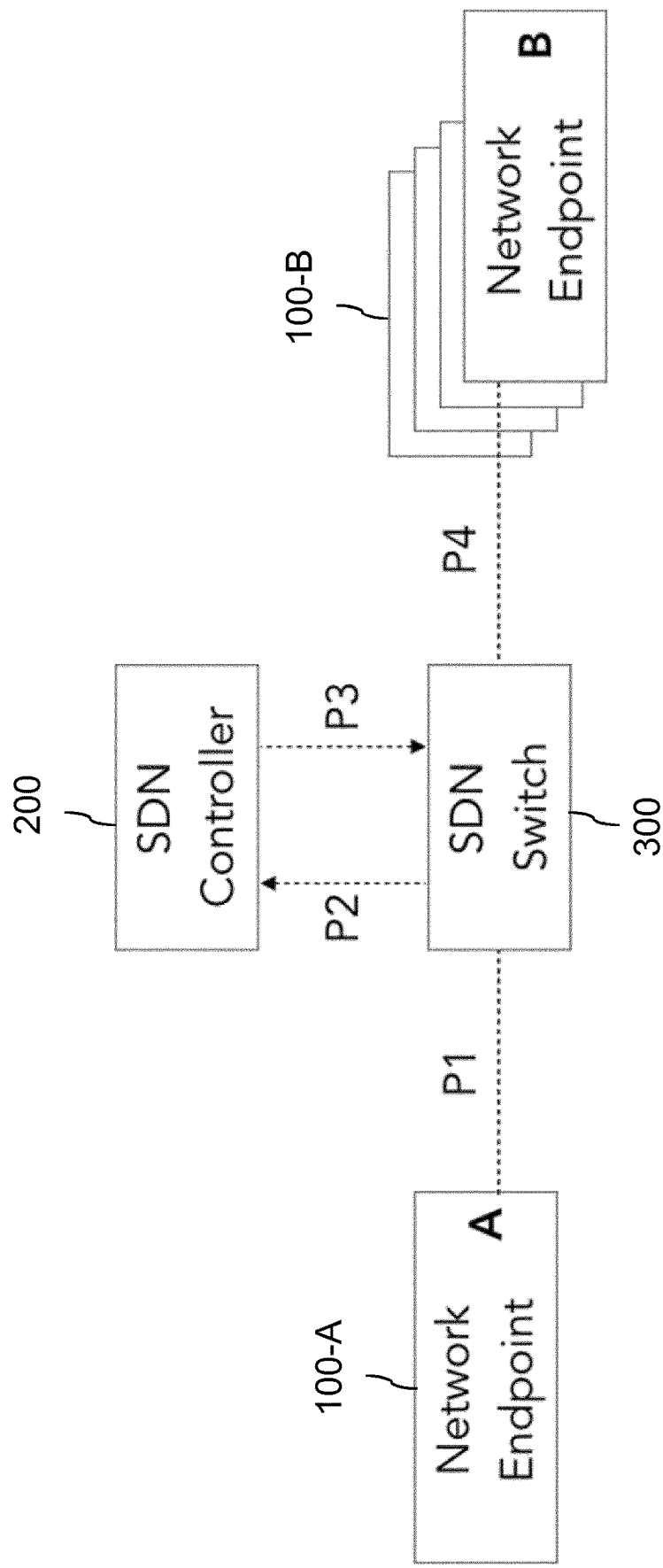
FIG. 1 is a schematic diagram illustrating an example of a network operating based on the Software Defined Networking, SDN, model.
Figure 2:
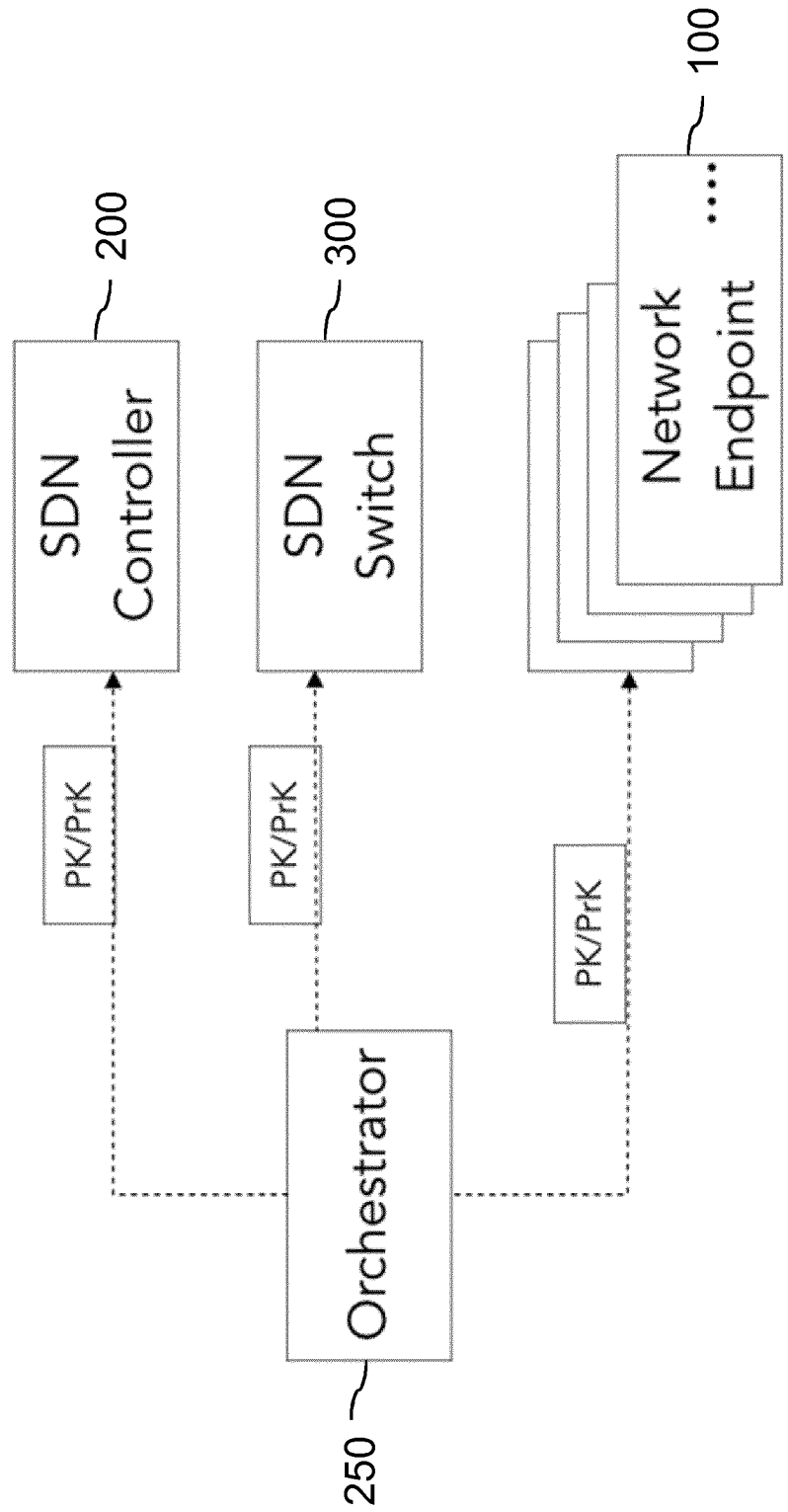
FIG. 2 is a schematic diagram illustrating an example of general provisioning of cryptographic material from an SDN orchestrator to the relevant network entities before establishing network communication.

Throughout the drawings, the same reference designations are used for similar or corresponding elements.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, and so forth, unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate.

Likewise, any advantage of any of the embodiments may apply to any other embodiments, and vice versa. Other objectives, features and advantages of the enclosed embodiments will be apparent from the following description.

As used herein, the non-limiting term "distributed network" may refer to any network where computing resources are distributed and/or the network can be seen as collection of network components and communication channels providing capability to transfer data between network endpoints.

As used herein, the non-limiting term "network endpoint" may refer to any relevant network entity or device in a distributed network, including but not limited to any client and/or server device.

As used herein, the non-limiting term "network controller" may refer to any network controller such as a network control unit or network controller circuitry capable of controlling network operation and/or communication.

As used herein, the non-limiting term "network switch" may refer to any network switch such as a network switch device or network switching circuitry capable of handling packet forwarding and/or performing switching operations for network communication.

As used herein, the term "network device" may refer to any device located in connection with a communication network, including but not limited to devices in access networks, core networks and similar network structures. The term network device may also encompass cloud-based network devices.

It may be useful to begin with a brief overview and analysis of the prior art solutions and a short summary of the insights and conclusions made by the inventors.

After careful analysis, the inventors have recognized that the existing solutions share the following problems and/or limitations:

Communications on each flow between any two peer endpoints occur over secure channels established through the same pairwise set of keying material. Thus, compromising the single set of keying material results in endangering the security of all flows between the two endpoints.

Asymmetric keying material, e.g. raw public keys and public certificates, is typically used to establish secure communication among two peer endpoints. While asymmetric keying material is flexible and convenient to manage, it results in computationally- and resource-demanding operations.

Symmetric keying material, e.g. pre-shared keys, is computationally lightweight and more affordable than the asymmetric keying approach. However, it is practically rarely used to establish secure communication among two peer endpoints, as it is much less flexible and much harder to distribute, especially in large-scale and highly dynamic scenarios.

Provisioning of symmetric keying material has to occur as a separate first task at deployment time, before communications between endpoints can start. Also, it requires pre-knowledge of network topology and communication patterns. This further complicates the management of symmetric keying material.

Based on this analysis, which form part of the inventive contribution, the inventors have recognized that it may be desirable to find a solution in order to:

Establish flows whose possible security impairment does not affect the security of other flows, Distribute symmetric keying material in a way which is fast, dynamic and automatic, e.g. without requiring a-priori knowledge of network topology and/or communication patterns, and/or Facilitate centralized patching and maintenance of cryptographic and key generation software and hardware.

Figure 3:
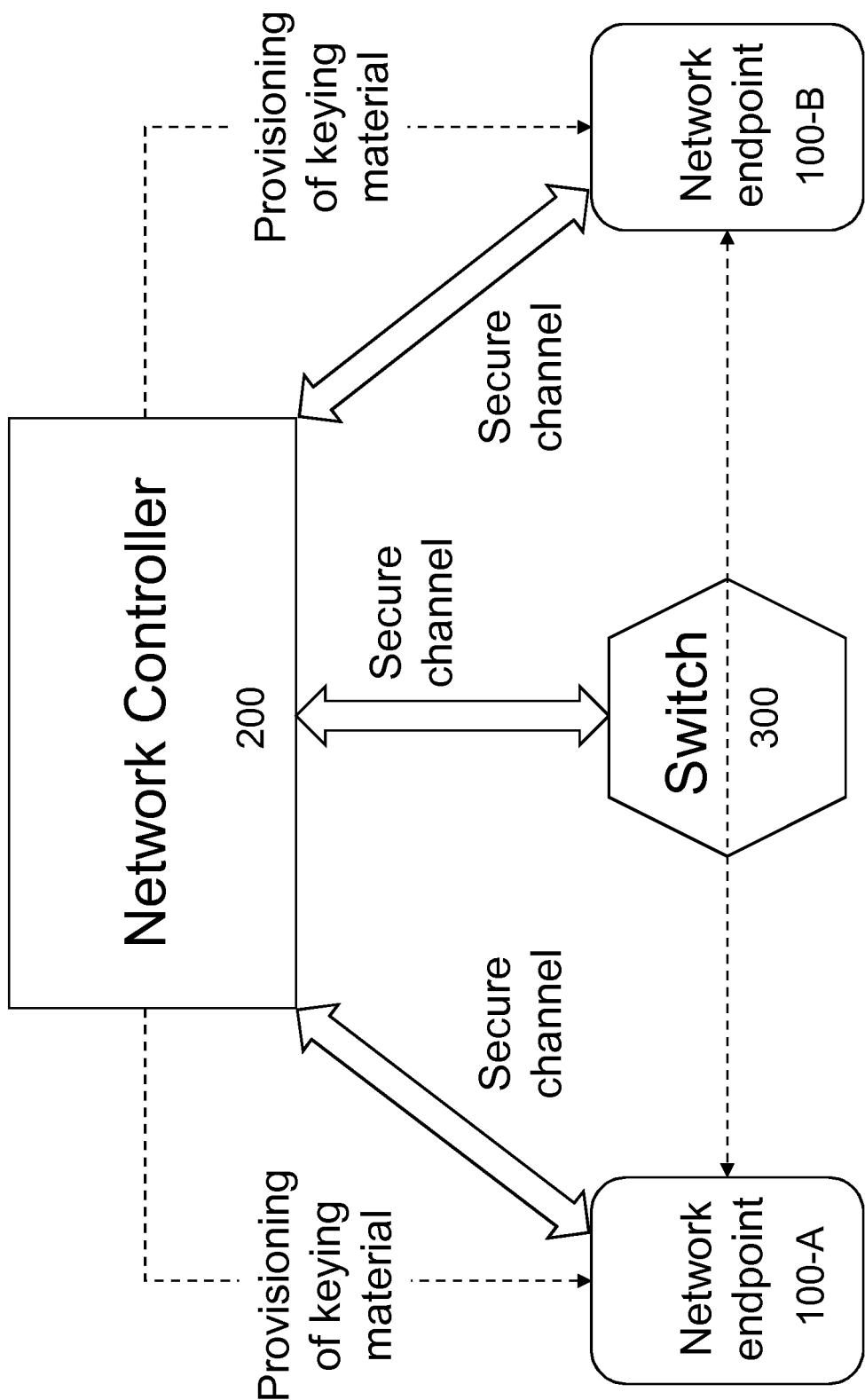
FIG. 3 is a schematic diagram illustrating an example of a generalized network architecture for secure network communication according to an embodiment.

FIG. 3 is a schematic diagram illustrating an example of a generalized network architecture for secure network communication according to an embodiment.

The overall network architecture includes two network endpoints 100-A and 100-B, a network controller 200 and a network switch 300. Each of the network endpoints 100 has a secure channel with the network controller 200, and the network switch 300 has a secure control channel with the network controller 200. The network endpoints 100-A and 100B are intended to communicate via the network switch 300. In order to more effectively enable secure communication, the network controller 200 is responsible for providing/generating and provisioning of symmetric keying material on a per-flow basis, as will be described herein.

Figure 4:
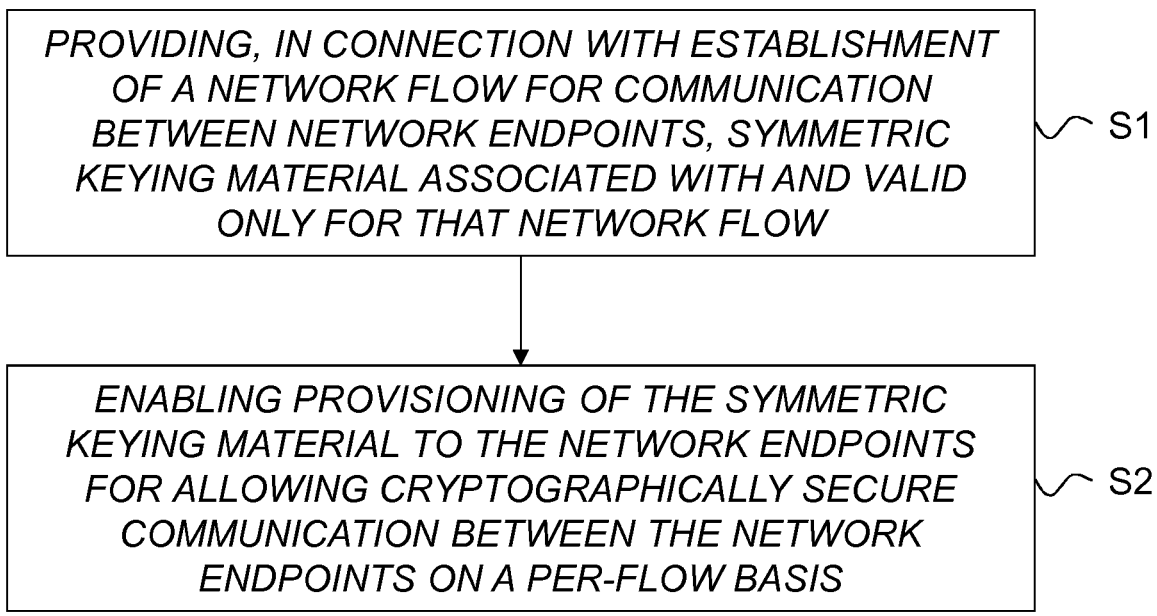
FIG. 4 is a schematic flow diagram illustrating an example of a method of operating a network controller for enabling secure communication between network endpoints in a distributed network according to an embodiment.

FIG. 4 is a schematic flow diagram illustrating an example of a method of operating a network controller for enabling secure communication between network endpoints in a distributed network according to an embodiment. The network controller has a secure channel with each of the network endpoints.

Basically, the method comprises:

S1: the network controller providing, in connection with establishment of a network flow for communication between the network endpoints, symmetric keying material associated with and valid only for that network flow; and S2: the network controller enabling provisioning of the symmetric keying material to the network endpoints for allowing cryptographically secure communication between the network endpoints on a per-flow basis.

By way of example, the network controller is providing and enabling provisioning of symmetric keying material per-flow and on-demand upon establishing corresponding network flows such that different flows between the network endpoints are related to different and independent security domains.

In other words, the symmetric keying material may be provided and/or generated contextually with the establishment of the network flow.

For example, the symmetric keying material includes one or more keys for symmetric cryptography including but not limited to confidentiality and/or integrity protection; such keys for symmetric cryptography being referred to as symmetric cryptographic keys, or simply symmetric keys.

In particular, the symmetric keying material for a pair of network endpoints may comprise a common symmetric cryptographic key or information for deriving such a symmetric cryptographic key.

As an example, the symmetric keying material may also comprise a key identifier for enabling identification of the symmetric key during handshake signaling between the network endpoints for establishing the cryptographically secure communication.

Since symmetric keys are provided and provisioned on a per-flow basis, different flows between two network entities are related to different and independent security domains. Therefore, compromising the symmetric key associated to a flow does not endanger the security of other flows.

In a sense, symmetric keys may thus be distributed ad-hoc and on-demand upon establishing corresponding network flows. As a consequence, it is no longer needed to provide two network endpoints or peers with pairwise keying material upon deployment. This is especially beneficial in large-scale and dynamic network scenarios.

For example, the provisioning of symmetric keying material may be seamlessly embedded in the management traffic devoted to network flow establishment. As a consequence, the provisioning and setup of symmetric keying material is overall faster than in current approaches, without sacrificing any flexibility.

Symmetric keying material may thus become a viable and feasible alternative to state-of-the-art approaches based on certificates and asymmetric cryptography. As a consequence, this reduces computational effort on the network endpoints, and hence economic costs. Besides, this may also reduce entropy requirements for the network endpoints, which is particularly important in virtualized environments.

An additional benefit of symmetric key based approaches for secure session establishment is that, compared to asymmetric key based approaches, they are way more robust to quantum-based attacks. The proposed technology facilitates the establishment of secure sessions using symmetric keys, thus strengthening system robustness against quantum-based attacks.

Figure 5:
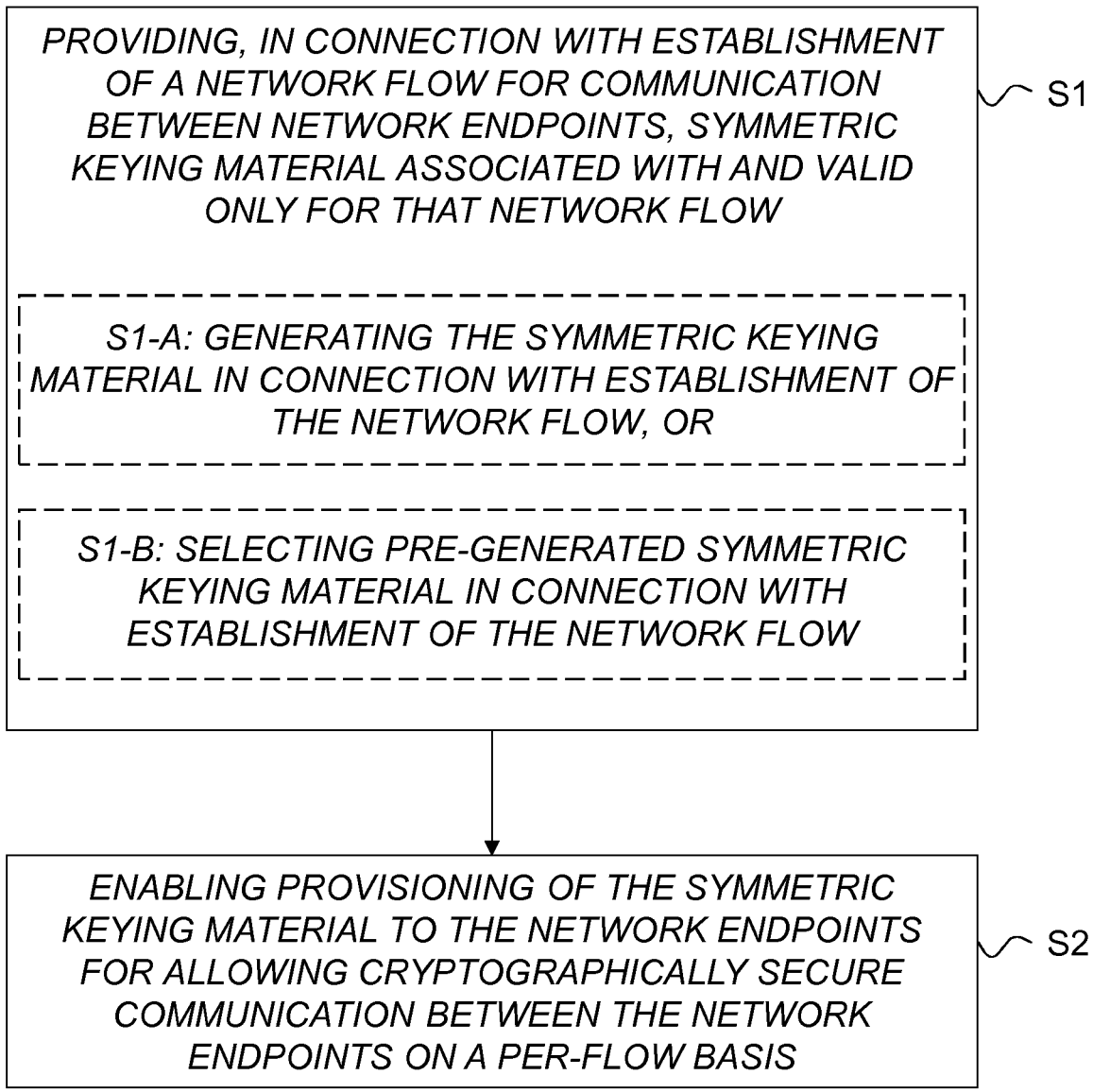
FIG. 5 is a schematic flow diagram illustrating an example of a method of operating a network controller according to a specific embodiment.

FIG. 5 is a schematic flow diagram illustrating an example of a method of operating a network controller according to a specific embodiment.

In this particular example, the step S1 of providing symmetric keying material comprises:

S1-A: the network controller generating the symmetric keying material in connection with establishment of the network flow, or S1-B: the network controller selecting pre-generated symmetric keying material in connection with establishment of the network flow.

In fact, the controller might have pre-generated pre-shared keys for performance optimization. Therefore, provisioning is actually on-demand, but not necessarily generation.

FIG. 6 is a schematic flow diagram illustrating an example of a method of operating a network controller according to another specific embodiment.

In this particular example, the step S2 of enabling provisioning of the symmetric keying material to the network endpoints includes:

S2-A: the network controller provisioning the symmetric keying material through the secure channels from the network controller to the network endpoints, or S2-B: the network controller provisioning the symmetric keying material to the initiating one of the network endpoints, assuming that the responding one of the network endpoints derives the symmetric keying material based on a secret shared with the network controller and a key identifier provided by the initiating one of the network endpoints or by the network controller.

By way of example, the step of providing symmetric keying material may generally be performed in response to a trigger for initiating establishment of the network flow.

For example, this trigger may originate from i) the network controller, ii) one of the network endpoints or iii) a network switch responsible for handling packet forwarding for the network flow.

It should though be understood that that the concept of a trigger could in fact be abstracted from the location of its origin.

By way of example, a trigger can be any of the following or a combination thereof:

1. Network events
   a. Change of topology: new endpoints added, endpoints removed, role of network components changed, and so forth.
   b. Updates of traffic shape (e.g. to fulfil changed Quality of Service requirements).
   c. Changes in the network traffic patterns.
   d. Changes in network routing.

2. External events
   a. Administrator input.
   b. Command issues by external applications. Such applications could for example be integrated in the controller or remotely communicating with the controller.
3. Logic in the network components
   a. Internal logic in the controller, switch and/or network endpoints (e.g. based on timeouts, timers, new applications installed or processes starting or ending and so forth).

By way of example, the trigger for initiating establishment of the network flow for communication between the network endpoints may be a flow setup request from a network switch 300 being generated in response to reception of a handshake message originating from an initiating one 100-A of the network endpoints and destined for a responding one 100-B of the network endpoints. The network controller 200 may respond to the network switch 300 with flow setup information enabling the network switch 300 to handle packet forwarding in the network flow and to forward the handshake message or an updated or new handshake message towards the responding one 100-B of the network endpoints.

For example, the network controller 200 may generate the updated or new handshake message and send the updated or new handshake message to the network switch 300.

Normally, the flow setup information may include information representative of which communication that is allowed between the network endpoints over the network flow.

As illustrated herein, the secure communication between the network endpoints may be effectuated via the network switch 300, which is responsible for effectuating packet forwarding between the network endpoints. As indicated, the network controller 200 has a secure control channel with the network switch 300.

Naturally, as an example, the secure communication may be established based on the Transport Layer Security, TLS, protocol or the Datagram Transport Layer Security, DTLS, protocol.

As already indicated, as an example, the distributed network may be a Software Defined Network, SDN, and the network controller 200 may be an SDN controller. The network switch 300 may be an SDN switch.

By way of example, the network endpoints 100 may include a client and a server.

Figure 7:
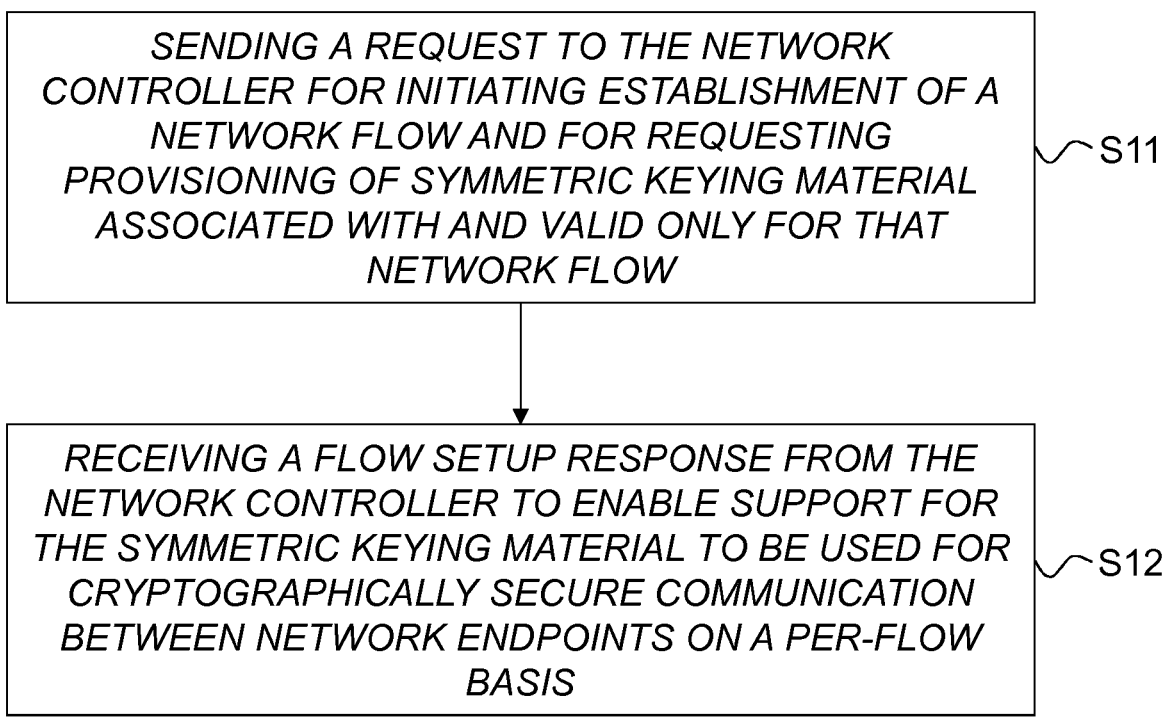
FIG. 7 is a schematic flow diagram illustrating an example of a method of operating a network switch for enabling secure communication between network endpoints in a distributed network according to an embodiment.

FIG. 7 is a schematic flow diagram illustrating an example of a method of operating a network switch for enabling secure communication between network endpoints in a distributed network according to an embodiment.

In this example, each of the network endpoints 100 has a secure channel with a network controller 200, and the network switch 300 has a secure control channel with the network controller 200.

Basically, the method comprises:

S11: the network switch sending a request to the network controller for initiating establishment of a network flow and for requesting provisioning of symmetric keying material associated with and valid only for that network flow; and S12: the network switch receiving a flow setup response from the network controller to enable support for the symmetric keying material to be used for cryptographically secure communication between the network endpoints on a per-flow basis.

By way of example, the step S12 of the network switch receiving a flow setup response enables a handshaking procedure between the network endpoints to agree upon using the symmetric keying material for cryptographically secure communication between the network endpoints on a per-flow basis.

Figure 8:
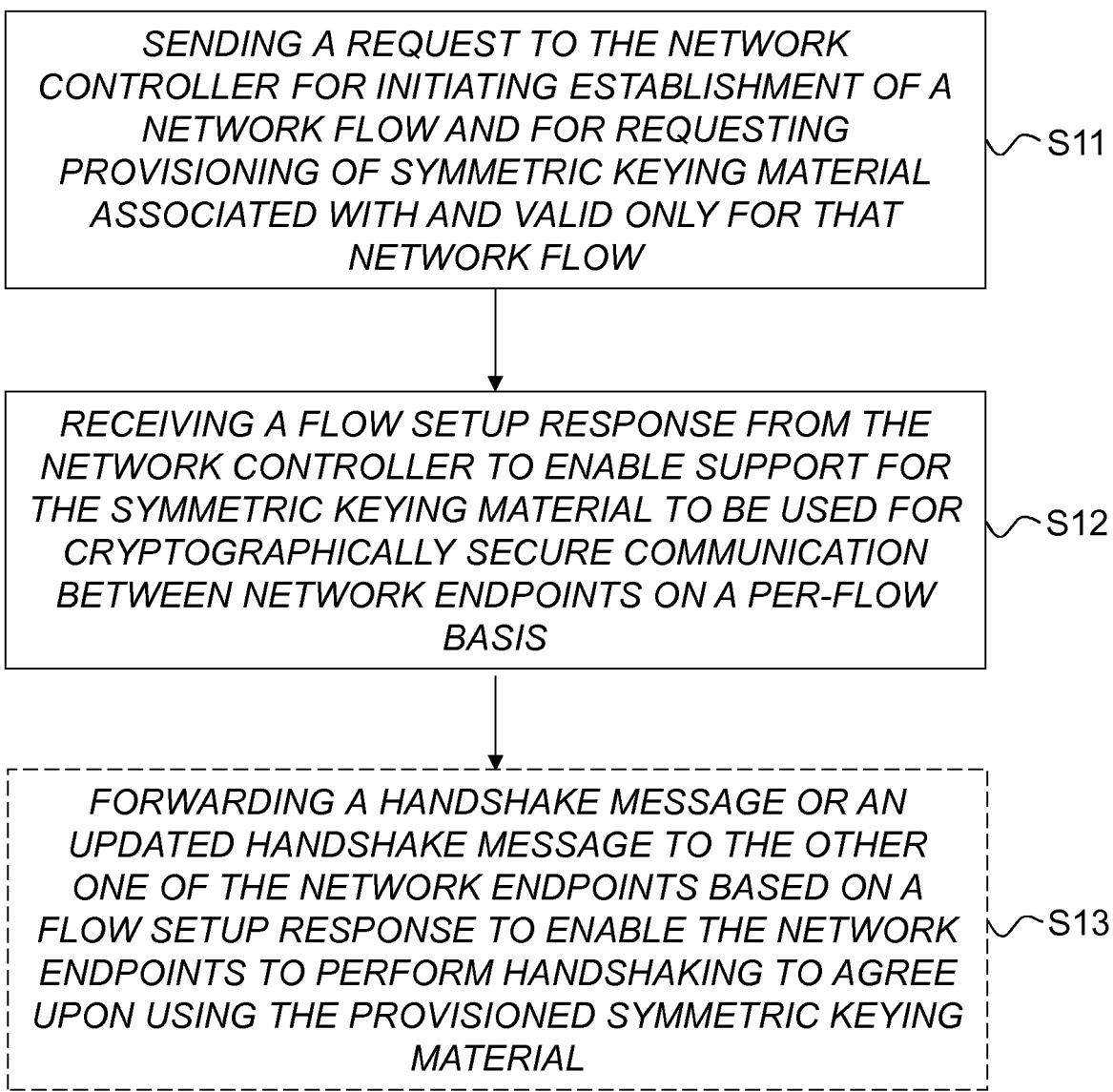
FIG. 8 is a schematic flow diagram illustrating an example of a method of operating a network switch according to a specific embodiment.

FIG. 8 is a schematic flow diagram illustrating an example of a method of operating a network switch according to a specific embodiment.

In this particular example, the step S11 of the network switch sending a request to the network controller for initiating establishment of a network flow is performed in response to a handshake message from one of the network endpoints to initiate a network flow. The method further comprises forwarding S13 the handshake message or an updated or new handshake message to the other one of the network endpoints based on the flow setup response to enable the network endpoints to perform handshaking to agree upon using the provisioned symmetric keying material for cryptographically secure communication between the network endpoints on a per-flow basis.

For example, the network switch 300 receives the updated or new handshake message from the network controller 200.

As previously mentioned, the symmetric keying material may comprise a symmetric key and a key identifier for enabling identification of the symmetric key during handshaking between the network endpoints for establishing the cryptographically secure communication.

By way of example, the handshaking may be performed based on the Transport Layer Security, TLS, protocol or the Datagram Transport Layer Security, DTLS, protocol.

In a particular example, the flow setup response includes information representative of which communication that is allowed between the network endpoints over the network flow, and the flow setup response enables the network switch to handle packet forwarding in the network flow.

As an example, the distributed network may be a Software Defined Network, SDN, the network switch 300 may be an SDN switch and the network controller 200 may be an SDN controller.

Optionally, the network endpoints 100 may include a client and a server.

Examples of Triggering the Provisioning of Symmetric Keying Material

As previously described, the step of generating/providing and/or provisioning symmetric keying material may be performed in response to a trigger for initiating establishment of the network flow.

Although it should be understood that the trigger may be abstracted from the actual location of its origin, the trigger may for example originate from the network controller, one of the network endpoints or a network switch responsible for handling packet forwarding for the network flow.

Figure 9:
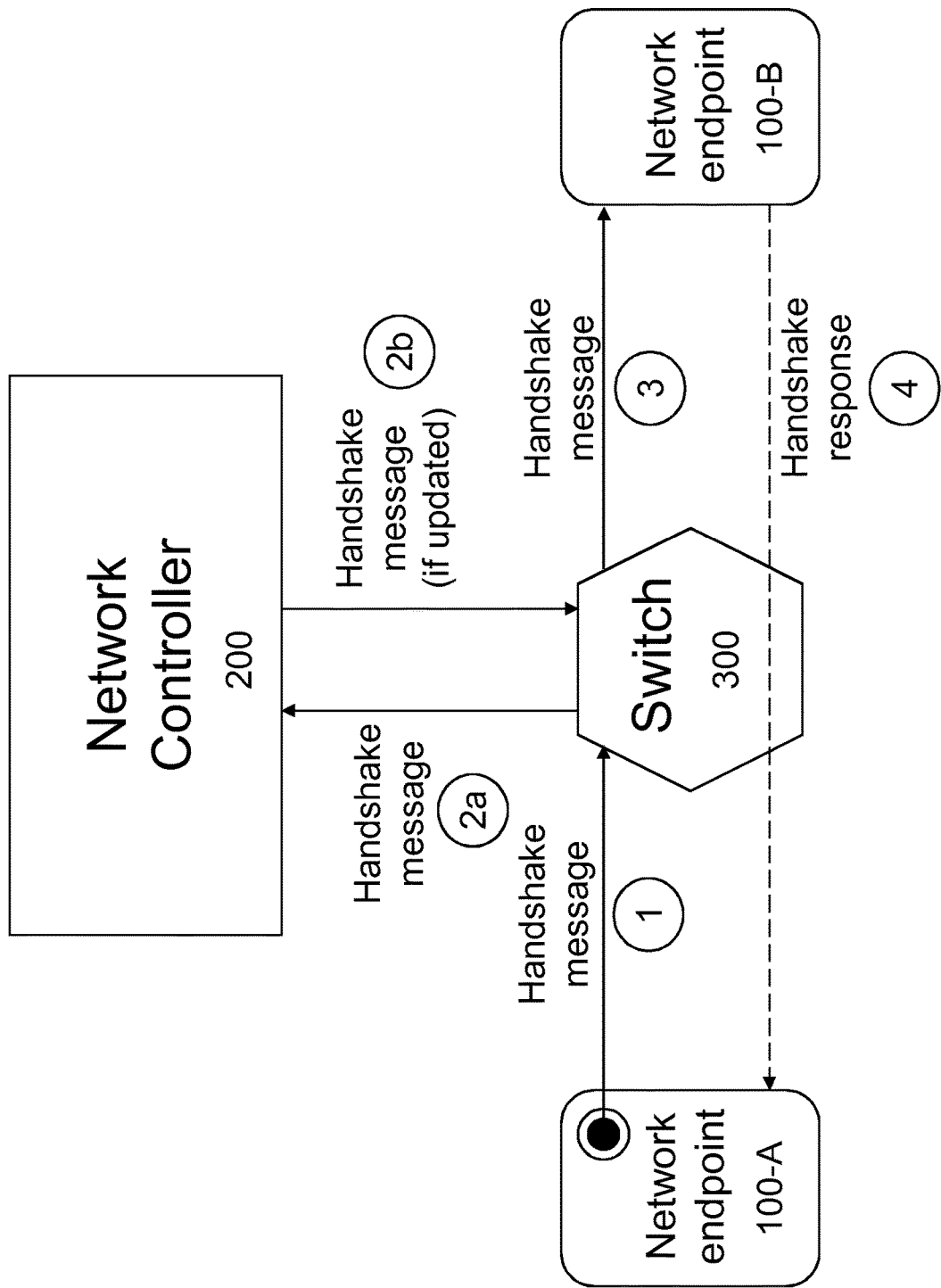
FIG. 9 is a schematic diagram illustrating an example of a network architecture for secure network communication including handshake signaling according to an embodiment.

FIG. 9 is a schematic diagram illustrating an example of a network architecture for secure network communication including handshake signaling according to an embodiment.

In this particular example, the trigger is initiated by one of the network endpoints 100-A. One of the network endpoints initiates by sending (1) a handshake message. This handshake message is intercepted by the switch 300, which forwards (2a) the handshake message to the network controller 200. The network controller 200 then initiates flow establishment together with provisioning of the symmetric keying material, and sends (2b) a reply to the switch 300 possibly including an updated or new handshake message, and the switch 300 then forwards (3) the initial handshake message or an updated or new handshake message to the other network endpoint 100-B, which may then respond (4) with a handshake response.

By way of example, the initial handshake message may be a (D)TLS ClientHello message from a client or a corresponding (D)TLS HelloRequest message from a server.

In the former case, the client may take the initiative and create an initial handshake message, e.g. a (D)TLS Client Hello message.

In the latter case, it is possible for the server to take the initiative, by sending a (D)TLS HelloRequest message intended for the client, asking the client to start the actual (D)TLS handshake. Such a HelloRequest message would then act as the "initial handshake message". In fact, the HelloRequest message from the server would then be able to trigger the flow establishment and the provisioning of the pre-shared key to the network endpoints.

For example, the following procedure may be applied when the initial trigger or handshake message is a HelloRequest message:
- The switch or the controller now originates the HelloRequest message on behalf of the network endpoint acting as (D)TLS Server.
- The flow establishment and the key provisioning work just as usual.
- The switch forwards the HelloRequest message to the network endpoint acting as (D)TLS Client.
- The (D)TLS Client starts the (D)TLS handshake by sending the ClientHello message to the (D)TLS Server.

It should thus be understood that the relevant key identifier may be provided by the initiating one of the network endpoints or by the network controller.

In the former case, the initiating network endpoint may provide the key identifier later on during the overall handshake procedure, e.g. in a (D)TLS ClientKeyExchange message. This may comply with the (D)TLS 1.2 standard protocol.

In the latter case, the network controller may update the ClientHello message by including the actual key identifier to be considered, and thus the controller actually provides that key identifier to the other network endpoint, through the switch forwarding the updated ClientHello message. In this case, which may comply with (D)TLS 1.3 standard protocol, the client may include a dummy key identifier in the initial ClientHello message, which is subsequently updated by the network controller, and forwarded by the switch to the server.

For (D)TLS 1.3 compliance, completely new features include the SDN Controller finalizing the original and incomplete ClientHello message, before the SDN Switch eventually forwards it to the server as per the newly established traffic flow.

It is also possible to envision a model where the initiative to generate a new handshake message or a general trigger comes directly from the controller or the switch. In such case it is not a network endpoint that sends the initial (handshake) message. Rather, this initial handshake message (or more generally a trigger message) is created "in the network" by the network switch or the network controller.

For example, the controller or switch may have pre-installed, or install at run-time, flow-establishment policies, and rely on decision-making logic that determines to enforce such policies, so as to enable unsolicited start of flow establishment without an explicit request from the interested party.

There is no need for any prior signaling from the initiating network endpoint such as a client, and the controller or switch may take the decision by itself, e.g. based on logic implemented as an application of the controller, or some administrator input.

By way of example, the handshake message sent from the switch includes an identifier of the initiating network endpoint such as a client and an identifier of the cryptographic material to be used, also referred to as a key identifier.

In this case, the responding network endpoint such as a server does not have to send any response to the handshake message, but may use this information to prepare for receiving, decrypting and processing any data stream that the initiating network endpoint such as a client will send through the flow. Preparation may for example include setting up a processing environment, instantiating a virtual machine, allocating storage or computation resources, and so forth.

Figure 10:
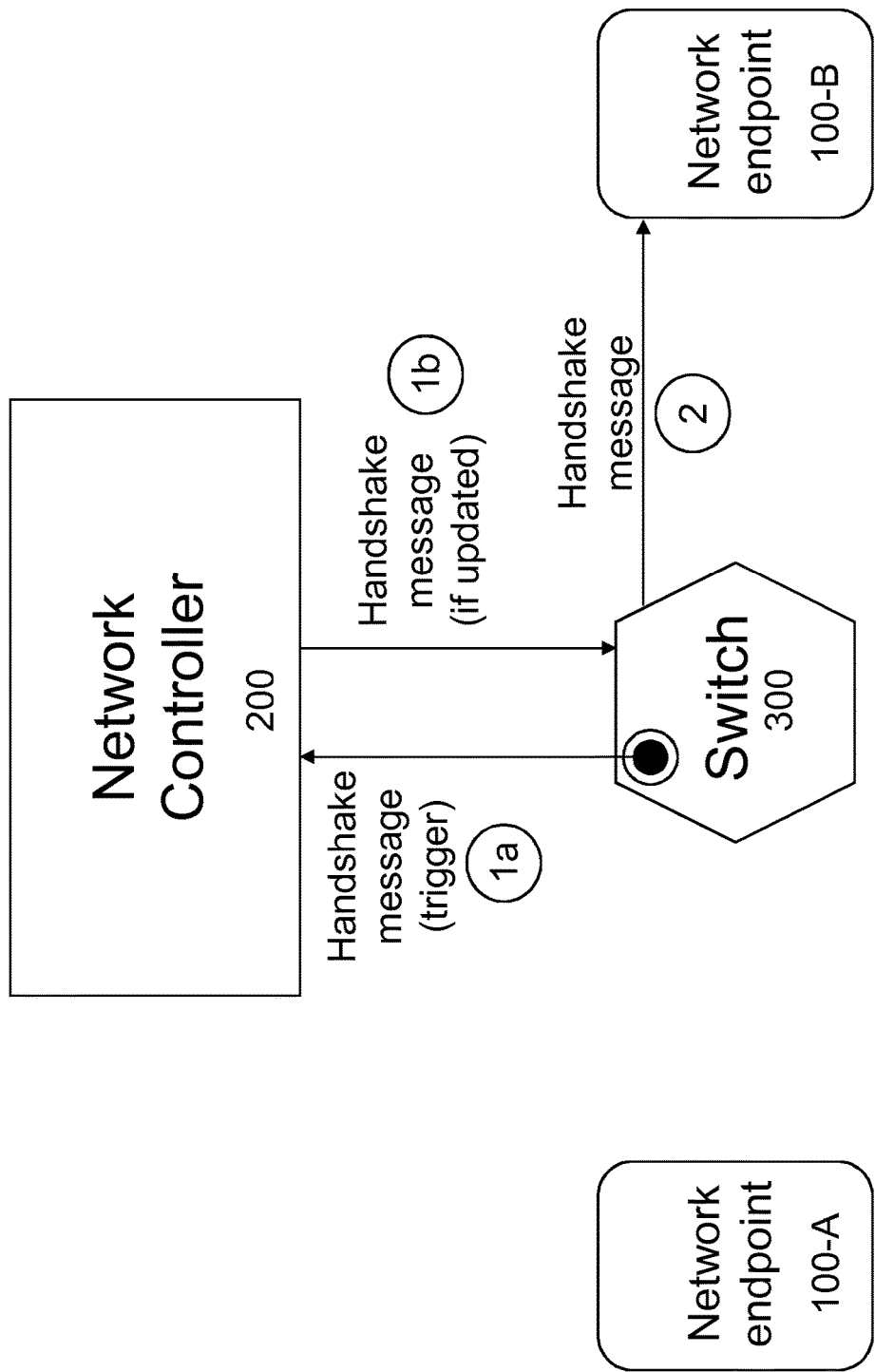
FIG. 10 is a schematic diagram illustrating an example of a network architecture for secure network communication where key provisioning is triggered by the switch according to an embodiment.

FIG. 10 is a schematic diagram illustrating an example of a network architecture for secure network communication where key provisioning is triggered by the switch according to an embodiment.

In this particular example, the trigger is initiated by the network switch. The switch may thus take the initiative in establishing the flow on behalf of a first network endpoint 100-A such as a client. Example: assisted peer discovery, e.g. to bootstrap protocols and/or unsolicitedly establish flows in distributed systems when nodes have not enough information on other peers to approach them directly. The switch may thereby prepare, by itself or in cooperation with the controller, a protocol-compatible handshake message, suitable for the relevant protocol implemented on the nodes.

For example, the handshake message may be forwarded (1a) from the switch 300 to the controller 200. The controller then initiates flow establishment together with provisioning of the symmetric keying material, and sends (1b) a reply to the switch 300 possibly including an updated or new handshake message. The switch 300 then forwards (2) the initial handshake message or an updated or new handshake message to the other network endpoint 100-B.

Figure 11:
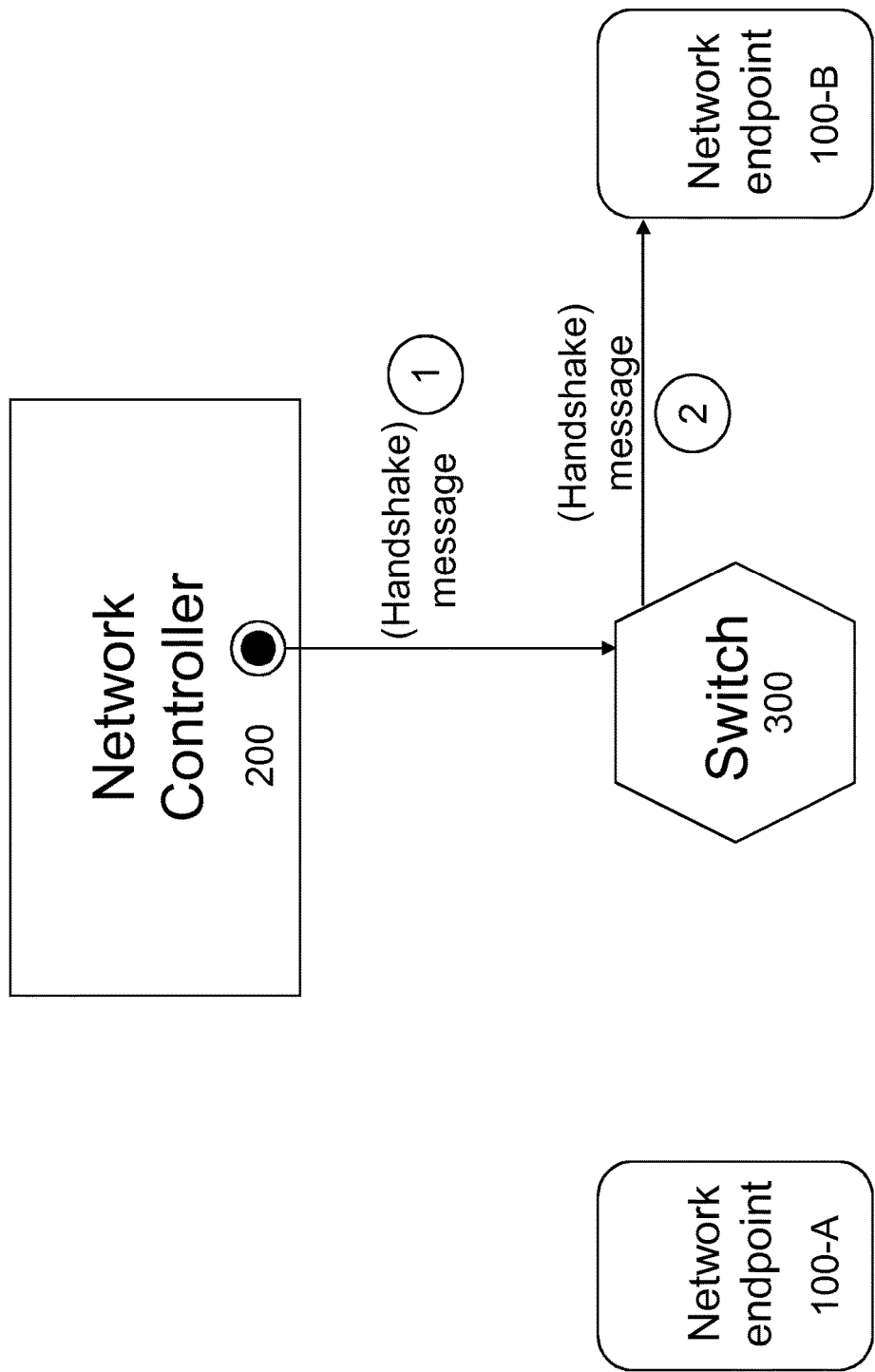
FIG. 11 is a schematic diagram illustrating an example of a network architecture for secure network communication where key provisioning is triggered by the network controller according to an embodiment.

FIG. 11 is a schematic diagram illustrating an example of a network architecture for secure network communication where key provisioning is triggered by the network controller according to an embodiment.

In this particular example, the trigger is initiated by the network controller. The controller may thus take the initiative in establishing the flow on behalf of a first network endpoint 100-A such as a client. Example: assisted peer discovery, e.g. to bootstrap protocols and/or unsolicitedly establish flows in distributed systems when nodes may have not enough information on other peers to approach them directly. The controller may thereby prepare a protocol-compatible handshake message, suitable for the relevant protocol implemented on the nodes.

For example, the controller initiates flow establishment together with provisioning of the symmetric keying material, and sends (1) a (handshake) message to the switch 300. The switch 300 forwards (2) the (handshake) message to the other network endpoint 100-B.

In case the generator of the initial handshake message is either an initiating network endpoint or the switch, the generator may not have all the information and/or keying material required to produce a complete and compliant initial handshake message. This may happen in distributed network systems that would rely on this invention for on-demand distribution of pre-shared keys. The switch may therefore upstream the incomplete initial handshake message to the controller, which has everything needed to complete the initial handshake message. The controller then updates and completes the initial handshake message to make it fully standard compliant with the used handshake protocol, hence producing a complete initial handshake message. The controller may then downstream the complete initial handshake message to the switch. By way of example, the switch may drop the buffered incomplete initial handshake message and replace it with the received complete initial handshake message.

For a better understanding, the proposed technology will now be described with reference to a number of non-limiting examples. In particular, reference will be made to SDN networking, but it should be understood that the proposed technology is not limited thereto and can be applied to any kind of distributed networking technology, especially for computer networking.

Sometimes, special reference is made to a client and a server, but the invention is not limited thereto, but may be applied to any network endpoints or network entities capable of communicating within a distributed network.

In particular example embodiments, the following general properties of relevant network environments (including today's SDN) may be considered:
  Separation of control and data traffic.
  Network traffic occurs over logical flows.
  Network entities can be deployed as physical, software, virtualized or a mix of them. The proposed technology works with all of these realizations and/or any combination of them.
  This proposed technology is applicable to any type of network endpoint; physical, software or virtualized.

As an example, a specific objective of the proposed solution is to enable fast, automatic and on-demand distribution of cryptographic pre-shared keys in distributed networks such as SDN networks.

Basically, a pre-shared key may be associated with a single flow and used to establish secure communication between network endpoints over that flow. In this particular example, two endpoints such as a client and server have their own respective secure (management) channel with an SDN Controller. By way of example, each time the client initiates a session/channel with the server and triggers the establishment of a new flow, the controller provides or generates a new symmetric pre-shared key associated to that flow and enables or effectuates provisioning of the key to the endpoints.

As a result, the derivation and transport of pre-shared keys are contextual with the establishment of the respective flow. For example, this process can occur through seamless integration of the proposed solution into different standard protocols, with variants in the specific mapping. Optimizations are possible, such as indirect provisioning of pre-shared keys to the server endpoint by means of key derivation.

A flow rule may be defined as a collection of attributes (some of which are matchable) of communication between endpoints; and of instructions (some of which may be null or default) for processing the packets within this communication. For example, the representation and encoding of a flow rule is standard dependent. An example is as per the OpenFlow standard, defining communication and inter-operations between SDN Controller and OpenFlow Switches.

Figure 12:
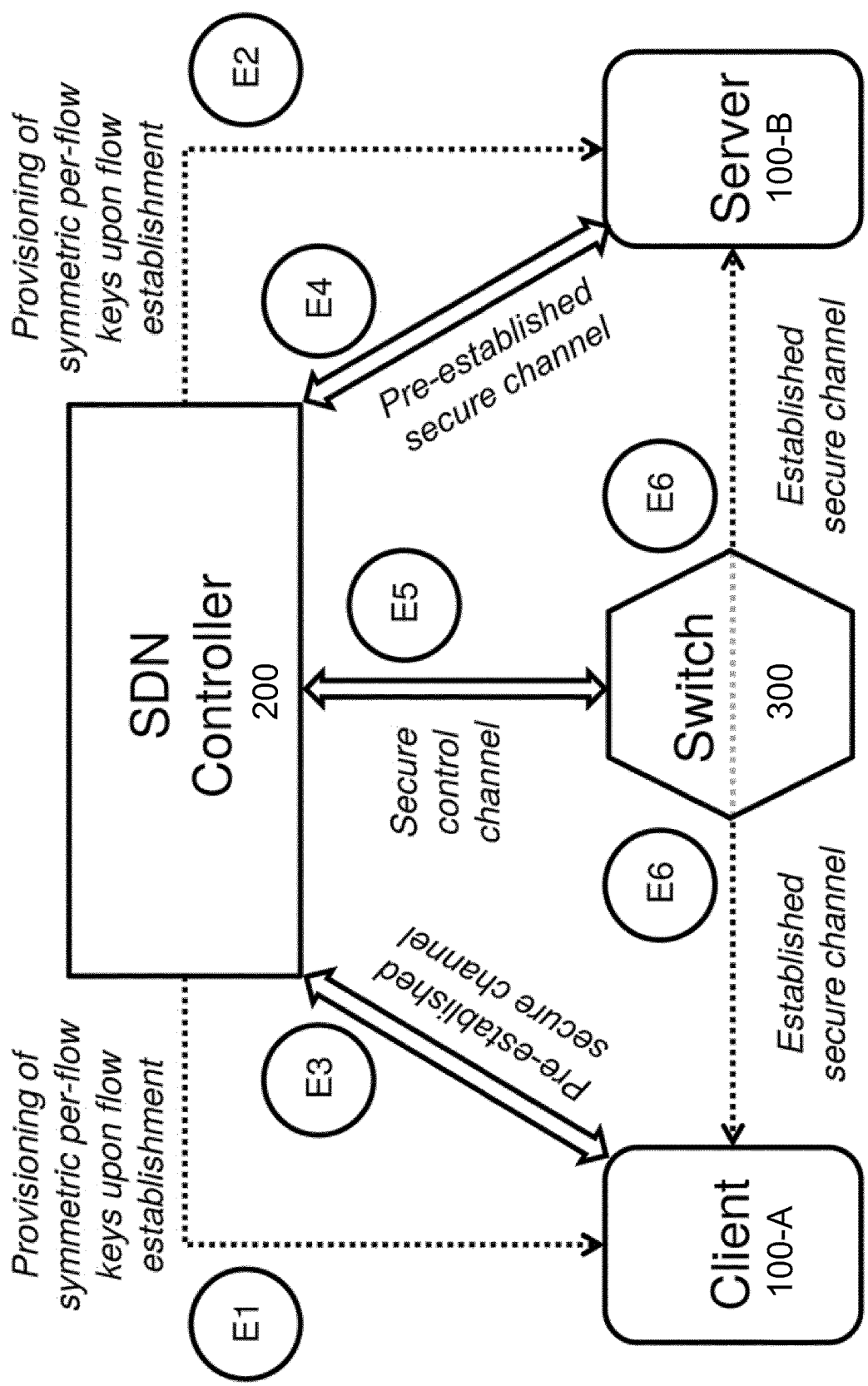
FIG. 12 is a schematic diagram illustrating an example of an SDN network architecture for secure network communication according to an embodiment.

FIG. 12 is a schematic diagram illustrating an example of an SDN network architecture for secure network communication according to an embodiment.

In this particular example, the SDN Controller provides the Client (C) and the Server (S) with per-flow symmetric keying material, contextually with the establishment of that network flow. The keying material is provided to C and S through the respective secure channels pre-established with the SDN Controller. C and S use the received keying material to establish a per-flow secure channel, e.g. through TLS or DTLS.

The overall architecture involves:
  An SDN controller 200, that is centrally responsible for:
    the establishment and management of network flows;
    the generation and distribution of per-flow symmetric keying material.
  A Client (C) 100-A, that has a pre-established secure channel with the SDN Controller (see E3); and intends to establish secure sessions/channels with the Server S (see E6).
  A Server (S) 100-B, that has a pre-established secure channel with the SDN Controller (see E4); and is available to establish secure sessions/channels with the Client C (see E6).
  A Switch 300, that has a secure control channel established with the SDN Controller (see E5); and is able to forward network traffic to/from C and S (see E6) as per the established flows.

By way of example:
  The SDN controller 200 provides C (see E1) and S (see E2) with symmetric per-flow keys.
  The key provisioning occurs through the pre-established secure channel that the SDN controller 200 has with C (see E3) and S (see E4).
  The key provisioning is contextual with the establishment of a new network flow between C and S, which occurs through the Switch and the SDN Controller (see E5).
  C and S use the received symmetric key to establish a per-flow secure session/channel (see E6). To this end, standard solutions can be used, such as TLS/DTLS version 1.2 or 1.3.

Figure 13:
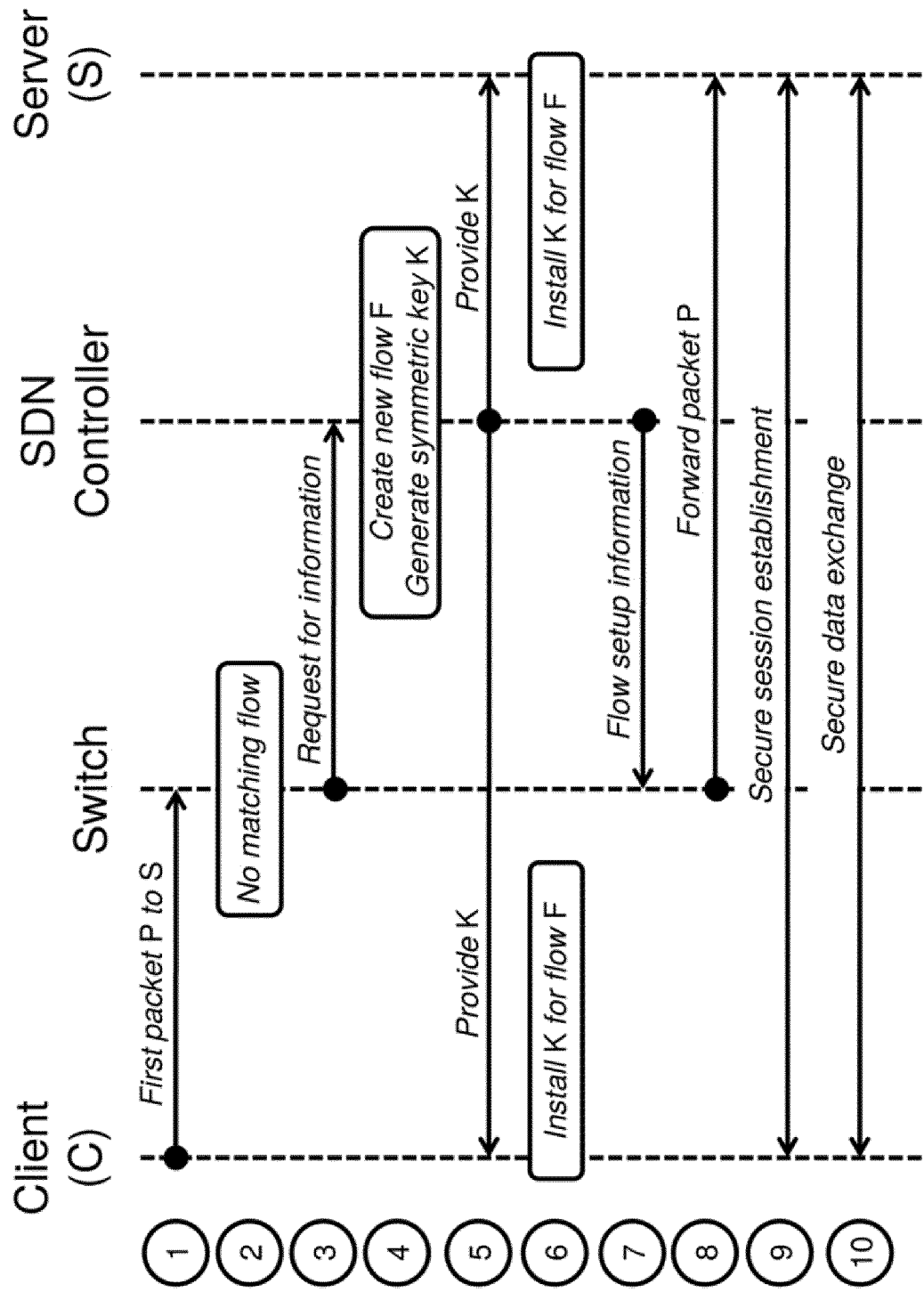
FIG. 13 is a schematic signaling and action diagram illustrating an example of a procedure for enabling secure network communication according to an embodiment.

FIG. 13 is a schematic signaling and action diagram illustrating an example of a procedure for enabling secure network communication according to an embodiment.

In this particular example, the following procedure may be followed:
1. C sends a first packet P addressed to S. The packet reaches the SDN Switch.
2. The SDN Switch does not find in its flow table a flow rule matching with packet P.
3. The SDN Switch sends a control message to the SDN Controller.
4. The SDN Controller:
   a. generates a flow rule F to handle traffic between C and S akin to packet P;
   b. generates a cryptographic symmetric key K associated to F, together with a related key identifier.
5. The SDN Controller provisions the key K and the related key identifier to both C and S, through the respective pre-established secure channel.
6. Both C and S install the received key K and related key identifier.
7. The SDN Controller communicates to the SDN Switch the new flow rule F.
8. The SDN Switch forwards the packet P to S, according to the flow rule F.
9. C and S use the key K to establish a secure session/channel. Possible protocols to establish a secure session/channel are the TLS/DTLS Handshake protocols.
10. C and S use the flow F to exchange packets over the established secure channel.

Example of Embodiment Adapted for Compliance with TLS/DTLS 1.2

At Step 1 in FIG. 13, the Client C starts a TLS/DTLS handshake with the Server S in pre-shared key mode. That is, packet P sent at Step 1 includes a ClientHello handshake message.

Later on during the handshake, C points S at the key K to be used as pre-shared key. In particular, C specifies the key identifier of the key K in the "PSK identity" field of the ClientKeyExchange handshake message.

Example of Embodiment Adapted for Compliance with TLS/DTLS 1.3

At Step 1 of FIG. 14 (see more details below), the Client C starts a TLS/DTLS handshake with the Server S in pre-shared key mode. That is, packet P sent at Step 1 includes a ClientHello handshake message.

In this example, C includes the following information in the ClientHello handshake message:

1. A psk_key_exchange_modes ClientHello extension, supporting the "psk_ke" mode.
2. A pre_shared_key ClientHello extension, present as last extension and including a collection of offered pre-shared keys. This collection is structured as follows:
   First, it includes a list of key identifiers.
   Second, it includes a list of key binders, one for each pre-shared key and in the same order as the key identifier list. Each key binder is an HMAC value computed with a binder key derived from the corresponding pre-shared key. The key binder is computed over the ClientHello message up to and including the key identifier list of the pre_shared_key ClientHello extension.

Evidently, C does not have the key K and its key identifier from the SDN Controller already at Step 1 in FIG. 13. Instead, C stores a dummy pre-shared symmetric key and related key identifier, which is not associated to any correspondent server. Accordingly, an example of the proposed solution is executed as per FIG. 14.

Figure 14:
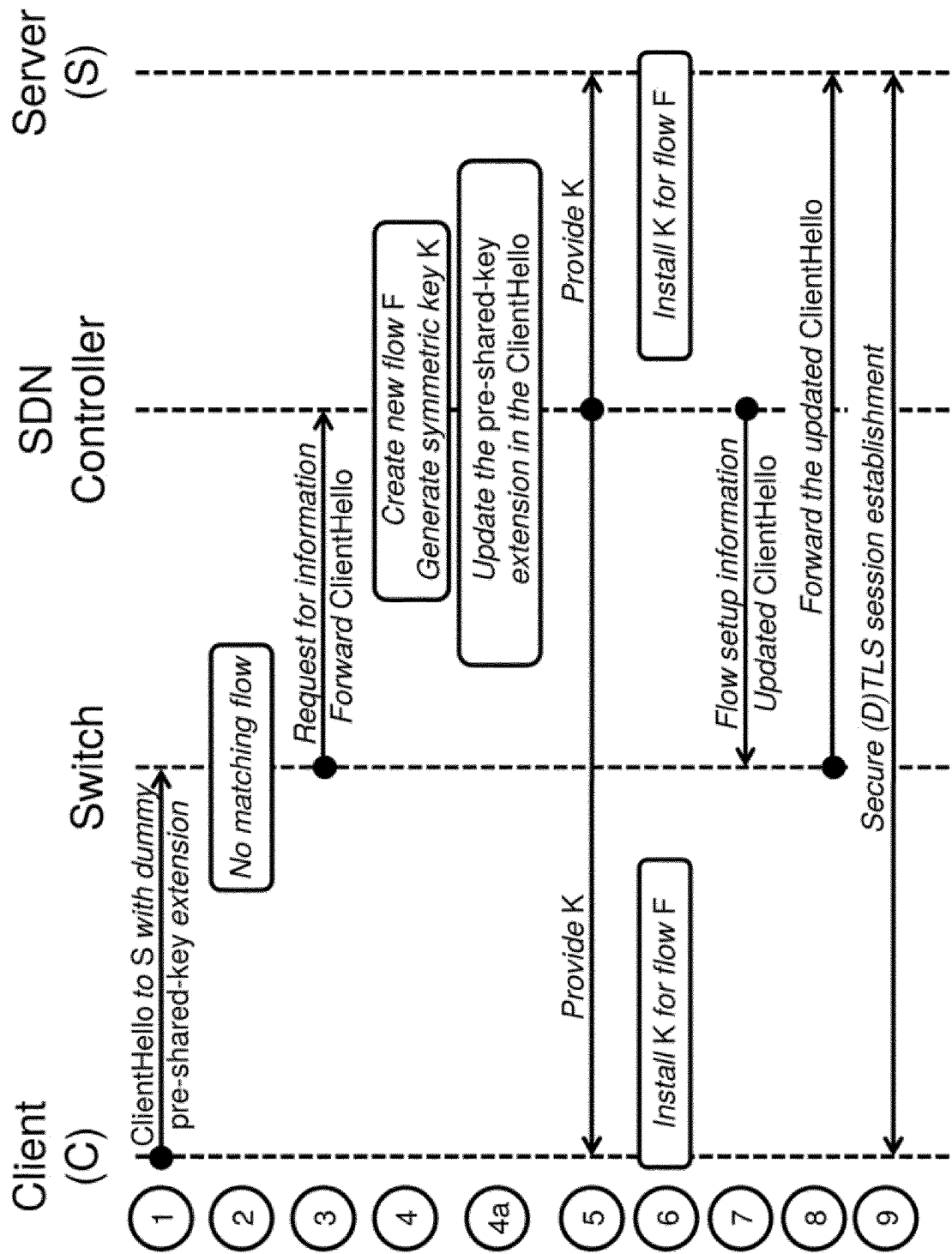
FIG. 14 is a schematic signaling and action diagram illustrating an example of a procedure for enabling secure network communication according to another embodiment.

FIG. 14 is a schematic signaling and action diagram illustrating an example of a procedure for enabling secure network communication according to another embodiment.

In this particular example, the following procedure may be followed:

1. C sends the ClientHello handshake message in the first packet P addressed to S. In particular, the pre_shared_key ClientHello extension offers only one dummy pre-shared key used by the Client for this purpose. Then, the packet reaches the SDN Switch.
2. The SDN Switch does not find any network flow matching with packet P.
3. The SDN Switch sends a control message to the SDN Controller, asking for information about setting up a new flow between C and S. When doing so, the SDN Switch forwards also the whole packet P including the ClientHello message to the SDN Controller.
4. The SDN Controller:
   a. generates a new network flow F to handle traffic between C and S akin to packet P;
   b. generates a cryptographic symmetric key K associated to flow F, together with a related key identifier.
4'. The SDN Controller builds a new pre_shared_key ClientHello extension for the ClientHello message in packet P. The new extension offers only the key K associated to flow F and includes a consistently computed key binder. The newly computed extension replaces the one originally included in the ClientHello message in packet P.
5. The SDN Controller provides both C and S with the key K and the related key identifier, through the respective pre-established secure channel.
6. Both C and S install the received key K and related key identifier.
7. The SDN Controller replies to the SDN Switch with:
   a. the information on how to handle packets in the new flow F;
   b. the packet P including the updated ClientHello message.
8. The SDN Switch forwards the packet P to S, as per the newly installed flow F.
9. C and S establish a secure session/channel, by using the key K, e.g. as per the TLS/DTLS 1.3 handshake protocol.

After that, C and S exchange packets related to the flow F over the established TLS/DTLS channel.

Example of Optimization for TLS/DTLS

It is possible for the SDN Controller to not explicitly provide the Server S with the key K. Instead, S can derive the key K from the key identifier, e.g. provided by the Client C as a hint during the TLS/DTLS handshake. This makes it possible to further reduce the communication overhead in the network.

For example, this optimization may be based on the following features:

The SDN Controller and S additionally share a pairwise symmetric key-derivation key K*.

The SDN Controller maintains a counter N_S, uniquely associated with S and incremented upon generating a new per-flow key K associated to S.

The SDN Controller generates the key K by means of a secure key derivation function KDF( ) that takes as input the key-derivation key K* and a nonce N set as the current value of the counter N_S.

The nonce N used to generate the key K is also used as the key identifier of that key.

For compliance with TLS/DTLS 1.2, the Client C may specify the nonce N as key identifier for the key K in the "PSK identity field" of the ClientKeyExchange Handshake message. Upon receiving the ClientKeyExhange Handshake message, the Server S derives the key K by means of KDF( ), using the retrieved nonce N and the key-derivation key K*. For more information, reference can be made to [5].

For compliance with TLS/DTLS 1.3, the SDN Controller may consider the nonce N as key identifier for the key K when building the new pre_shared_key ClientHello extension for the ClientHello message in packet P. Upon receiving the ClientHello message, the Server S derives the key K by means of KDF( ), using the retrieved nonce N and the key-derivation key K*.

In (D)TLS 1.2, the PSK identity (more generally a key identifier) is not in the ClientHello message, but it rather comes later on in the ClientKeyExchange message. In (D)TLS 1.3, the (PSK) key identifier or identity is expected in the ClientHello extension, and in an example embodiment the controller replaces the dummy one from the client with the actual one to be used (together with the related key binder).

The server can derive the shared symmetric key upon reception of the ClientHello for the (D)TLS 1.3 embodiment. In (D)TLS 1.2, this happens later on upon receiving the ClientKeyExchange message including the (PSK) key identifier or identity.

This provides one or more advantages and/or optimizations such as:
- avoiding direct provisioning from the controller to the server,
- the server does not need to wait for the controller,
- no additional message needs to be sent between controller and server.

Furthermore, there are different variants. The PSK identity (more generally a key identifier) used for the key derivation may be provided by the client or by the controller. In the latter case, the client may provide a dummy (e.g. a very short or empty value, enabling a reduced message overhead in the forwarding plane) and then the PSK identity (more generally a key identifier) may be provided to the client by the controller together with shared symmetric key.

To avoid loss of generality, the case of using a counter as the key identifier is merely an example. Alternatively, a random or pseudo-random value may be used.

Preferably, freshness under the same key K*, shared between the controller and server, should be assured. In other words, one should not have two identical PSK identities generated from the same K* and assigned to different flows and/or clients, especially in order to be able to provide separation of security domains.

With regard to the server behavior, information on how to use the key identifier may be embedded in the key identifier as such. For example, a special format of the PSK identity, e.g. a set of unique bits in the beginning of the string.

Various embodiments of the proposed technology display one or more of the following features:
- Symmetric keying material is established per network flow, rather than per pair of endpoints. As a result, compromising a single pre-shared key does affect other network flows among the same two endpoints.
- Symmetric keying material is generated and distributed contextually at network flow establishment time, rather than at deployment time. This improves the state of the art, e.g. as follows:
    i) the suggested approach does not require dedicated request/response interactions between a network endpoint and the network controller. Thus, with respect to current approaches and practices, it makes it possible to provide the symmetric keying material to the network endpoints in a shorter amount of time.
    ii) the suggested approach does not require advanced knowledge of network topology and traffic patterns.
    iii) the suggested approach simplifies key management operations and enables dynamic use of symmetric keys.
    iv) the suggested approach decreases the required code-base of network endpoints, resulting in improved performance (due to relaxed entropy requirements) and potentially reduced costs.
    v) running less code on network nodes reduces the deployment's attack surface and simplifies patch management.
- The suggested approach facilitates the provisioning of symmetric keying material, making it a feasible alternative to the state of the art based on the use of certificate-based approaches. As a consequence:
    i) Use of symmetric keys results in cost reduction due to reduced computational effort on the network nodes.
    ii) Use of symmetric keys reduces the need for entropy on the network nodes. This is especially relevant for virtualized environments.
- The proposed technology is seamlessly embeddable into (upcoming) standard security protocols, such as (D)TLS versions 1.2 and 1.3. This is important since it allows the proposed solution to be immediately deployable, without breaking involved security standards.

It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units. The terms "processing circuitry" and "processor" may be used interchangeably in parts of this disclosure.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect, there is provided a network controller 200 configured to enable secure communication between network endpoints 100 in a distributed network, wherein the network controller 200 has a secure channel with each of the network endpoints 100.

Preferably, the network controller 200 is configured to provide, in connection with establishment of a network flow for communication between the network endpoints, symmetric keying material associated with and valid only for that network flow. The network controller 200 is also configured to enable provisioning of the symmetric keying material to the network endpoints 100 for allowing cryptographically secure communication between the network endpoints on a per-flow basis.

By way of example, the distributed network may be a Software Defined Network, SDN, and the network controller 200 may be an SDN controller.

For example, the network controller 200 may be implemented as a cloud-based network device on dedicated hardware and/or in a virtualized environment.

In a particular example, the network controller 200 may be co-located with a cloud orchestrator 250 for configuring and/or managing virtual entities in a cloud deployment.

In another example, the network controller 200 may be co-located with a network switch 300 responsible for effectuating packet forwarding between the network endpoints, or implemented on a different hardware platform.

Figure 15:
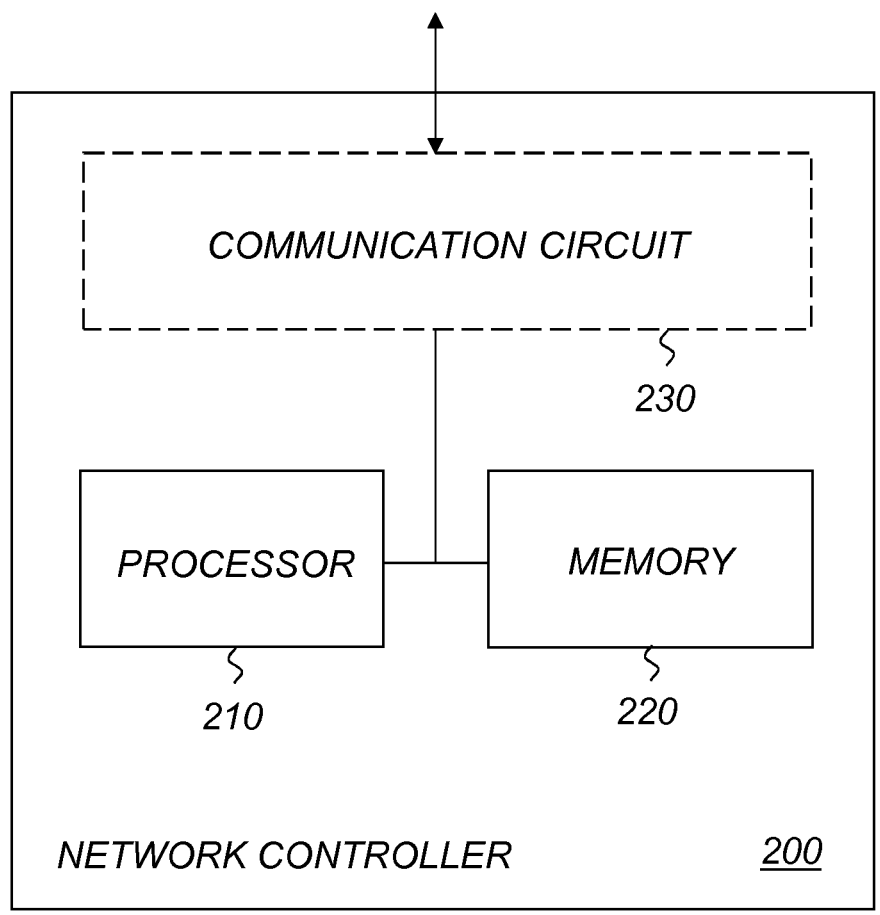
FIG. 15 is a schematic diagram illustrating an example of a network controller according to an embodiment.

FIG. 15 is a schematic diagram illustrating an example of a network controller according to an embodiment. In this particular example, the network controller 200 comprises processing circuitry 210 and memory 220, the memory 220 comprising instructions executable by the processing circuitry 210, whereby the processing circuitry 210 is operative to enable secure communication between the network endpoints 100.

Optionally, the network controller 200 may also include a communication circuit 230. The communication circuit 230 may include functions for wired and/or wireless communication with other devices and/or network nodes in the network. In a particular example, the communication circuit 230 may be based on radio circuitry for communication with one or more other nodes, including transmitting and/or receiving information. The communication circuit 230 may be interconnected to the processor 210 and/or memory 220. By way of example, the communication circuit 130 may include any of the following: a receiver, a transmitter, a transceiver, input/output (1/O) circuitry, input port(s) and/or output port(s).

It is also possible to provide a solution based on a combination of hardware and software. The actual hardware-software partitioning can be decided by a system designer based on a number of factors including processing speed, cost of implementation and other requirements.

According to another aspect, there is provided a network switch 300 configured to enable secure communication between network endpoints 100 in a distributed network. Each of the network endpoints 100 has a secure channel with a network controller 200, and the network switch 300 has a secure control channel with the network controller 200.

Preferably, the network switch 300 is configured to send a request to the network controller 200 for initiating establishment of a network flow and for requesting provisioning of symmetric keying material associated with and valid only for that network flow. The network switch 300 may further be configured to receive a flow setup response from the network controller 200 to enable support for the symmetric keying material to be used for cryptographically secure communication between the network endpoints 100 on a per-flow basis.

By way of example, the distributed network may be a Software Defined Network, SDN, the network switch 300 may be an SDN switch and the network controller 200 may be an SDN controller.

For example, the network switch 300 may be implemented as a cloud-based network device on dedicated hardware and/or in a virtualized environment.

It should be understood that the network switch 300 may be a software-based switch or a hardware switch.

In a particular example, the network switch 300 is co-located with the network endpoints 100, or implemented on a different hardware platform.

In another example, the network switch 300 is co-located with the SDN controller 200, or implemented on a different hardware platform.

Figure 16:
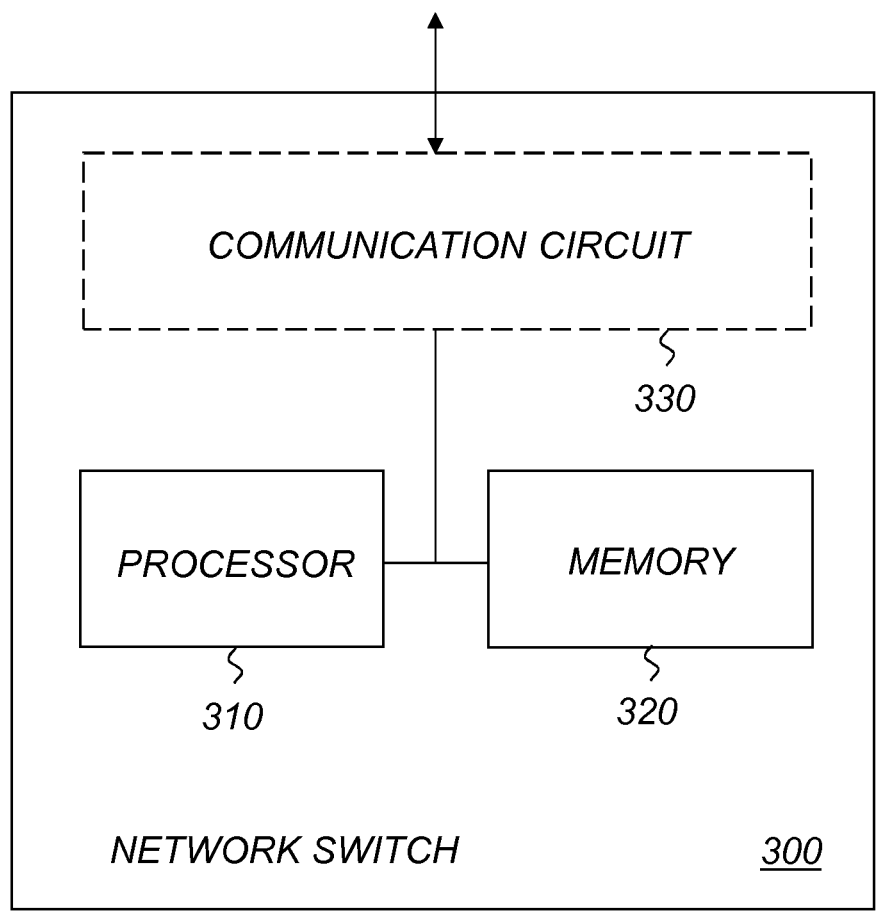
FIG. 16 is a schematic diagram illustrating an example of a network switch according to an embodiment.

FIG. 16 is a schematic diagram illustrating an example of a network switch according to an embodiment. In this particular example, the network switch 300 comprises processing circuitry 310 and memory 320, the memory 320 comprising instructions executable by the processing circuitry 310, whereby the processing circuitry 310 is operative to enable secure communication between the network endpoints 100.

Optionally, the network switch 300 may also include a communication circuit 330.

Figure 17:
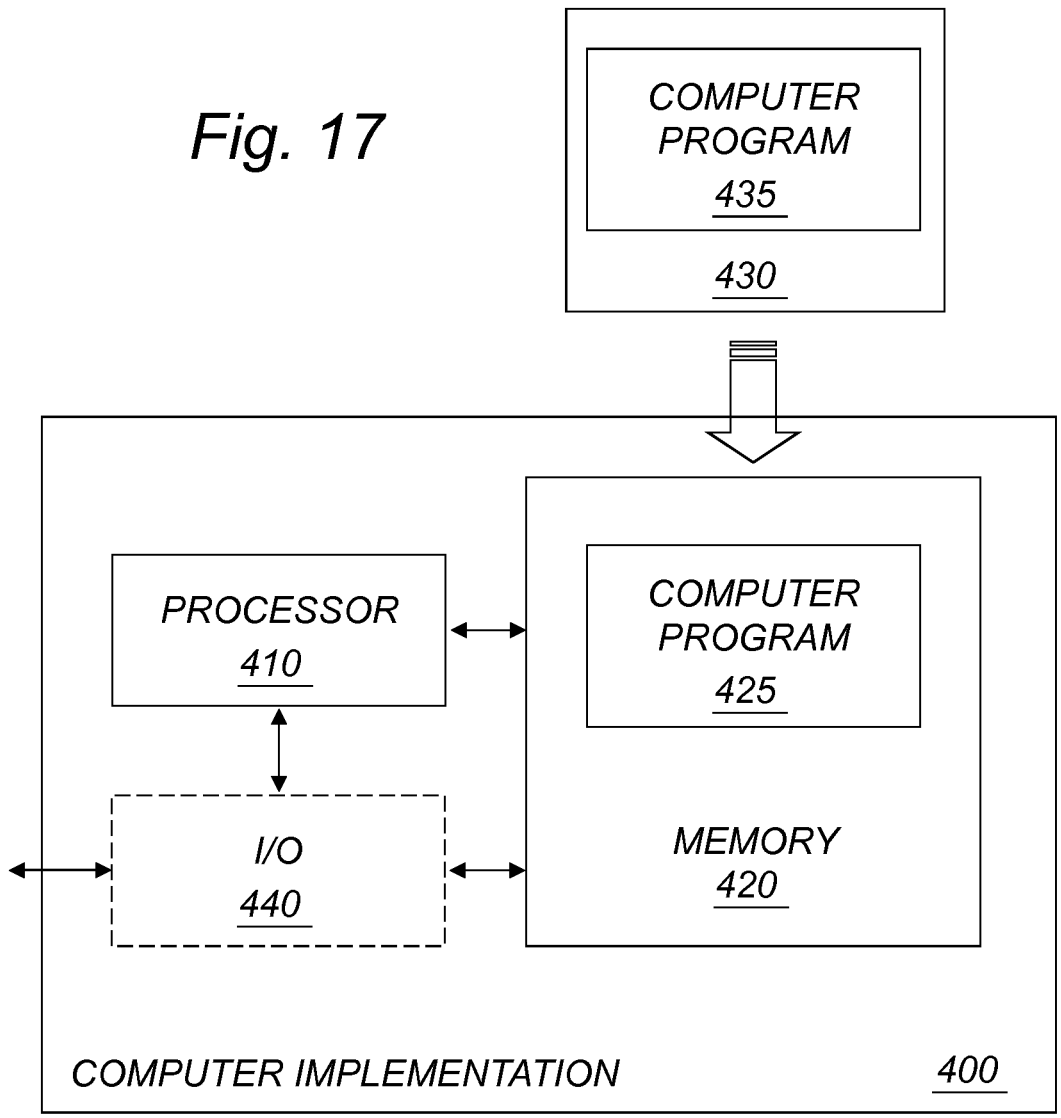
FIG. 17 is a schematic diagram illustrating an example of a computer-implementation according to an embodiment.

FIG. 17 is a schematic diagram illustrating an example of a computer-implementation according to an embodiment. In this particular example, at least some of the steps, functions, procedures, modules and/or blocks described herein are implemented in a computer program 425; 435, which is loaded into the memory 420 for execution by processing circuitry including one or more processors 410. The processor(s) 410 and memory 420 are interconnected to each other to enable normal software execution. An optional input/output device 440 may also be interconnected to the processor(s) 410 and/or the memory 420 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 410 is thus configured to perform, when executing the computer program 425, well-defined processing tasks such as those described herein.

The processing circuitry does not have to be dedicated to only execute the above-described steps, functions, procedure and/or blocks, but may also execute other tasks.

In a particular embodiment, there is provided a computer program 425, 435 for operating, when executed, a network controller 200 for enabling secure communication between network endpoints 100 in a distributed network. The computer program 425, 435 comprises instructions, which when executed by at least one processor 410, cause the at least one processor 410 to perform the relevant method as described herein.

In another particular embodiment, there is provided a computer program 425, 435 for operating, when executed, a network switch 300 for enabling secure communication between network endpoints 100 in a distributed network. The computer program 425, 435 comprises instructions, which when executed by at least one processor 410, cause the at least one processor (410) to perform the relevant method as described herein.

According to another aspect, there is provided a computer-program product comprising a computer-readable medium 420; 430 having stored thereon such a computer program 425; 435.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 425; 435 may be realized as a computer program product, which is normally carried or stored on a computer-readable medium 420; 430, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Alternatively it is possible to realize such module(s) predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

The term module or unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

It is also becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:

Consolidation of network functionality into virtualized software running on customized or generic hardware. This is sometimes referred to as network function virtualization.

Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

The proposed technology is applicable for a virtualized and distributed context and can therefore be readily implemented in a distributed manner. The invention can be implemented on different hardware nodes in a network—either in the same data center or deployed across different data centers, e.g. as described below. The invention can be entirely implemented in a virtualized environment.

Note that the below description focuses on the network elements of a software defined network deployment assumed to run in a cloud environment. The description below does not include other common components of a cloud deployment, such as an orchestrator, scheduler, or image store. Finally, the description below assumes that the SDN Controller implements itself (or as an application) the function of a credential manager for the SDN deployment. These are not necessary features, but only serves as examples for illustrative purposes.

Figure 18:
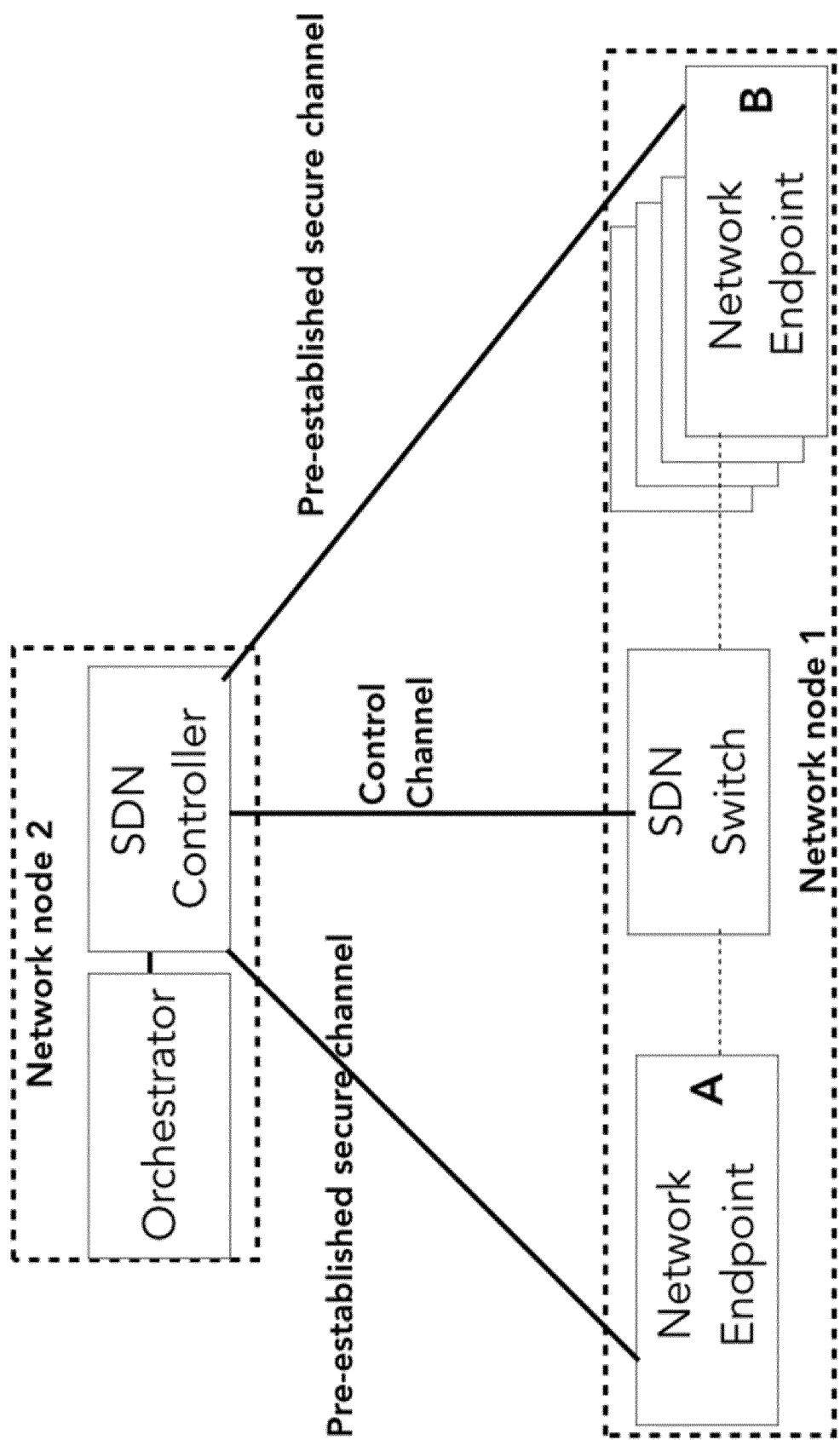
FIG. 18 is a schematic diagram illustrating an example of deployment of network entities 25 according to an embodiment.

FIG. 18 is a schematic diagram illustrating an example of deployment of network entities according to an embodiment.

In this example, the invention is implemented on two distinct network nodes. The client and server network endpoints (A and B in the figure) are located on the same network node; they communicate through a SDN switch running on the same network node. The SDN switch is programmed and controlled by an SDN Controller located on a second network node.

In this scenario, the network endpoints can be implemented as virtualized entities (virtual machine, lightweight virtualization containers or unikernels). The SDN switch can be implemented as a software switch running either natively, or in a virtualized environment, on network node 1. The SDN Controller can be deployed on network node 2—either natively or in a virtualized environment. The SDN Controller can be collocated with the cloud orchestrator, that configures, instantiates and manages virtual instances throughout the cloud deployment.

Figure 19:
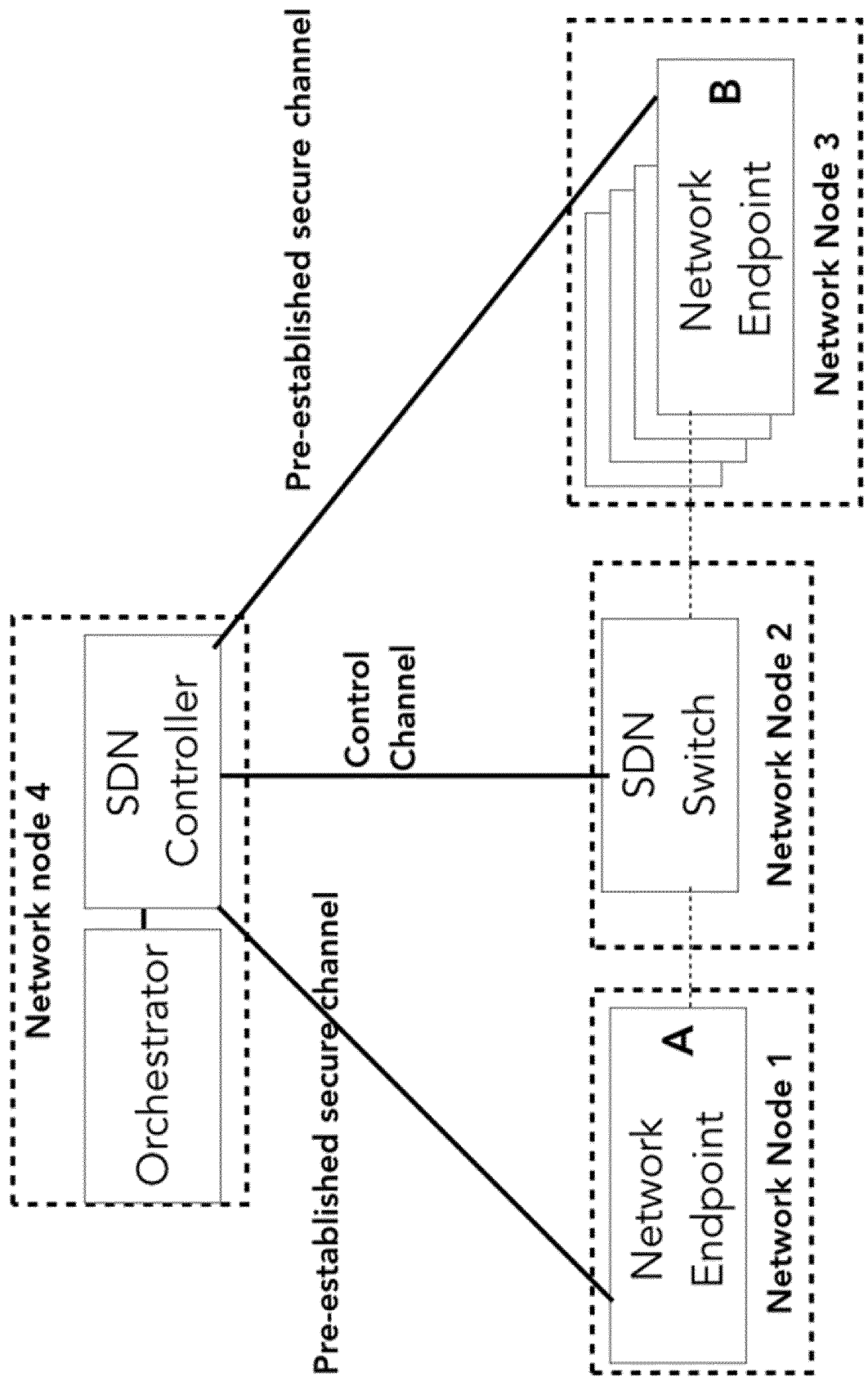
FIG. 19 is a schematic diagram illustrating an example of deployment of network entities according to another embodiment.

FIG. 19 is a schematic diagram illustrating an example of deployment of network entities according to another embodiment.

In this example, there is illustrated an implementation where the components are deployed on distinct network nodes. The network endpoints (running on Network Node 1 and 3) can be deployed either natively or in a virtualized environment. The SDN switch (running on Network Node 2) can be implemented either as a software switch running on a commodity network node, or as a dedicated hardware switch. Finally, the SDN Controller can be deployed on a different network node 4, potentially collocated with the cloud orchestrator.

Other deployment variations are also possible, as described below.

Figure 20:
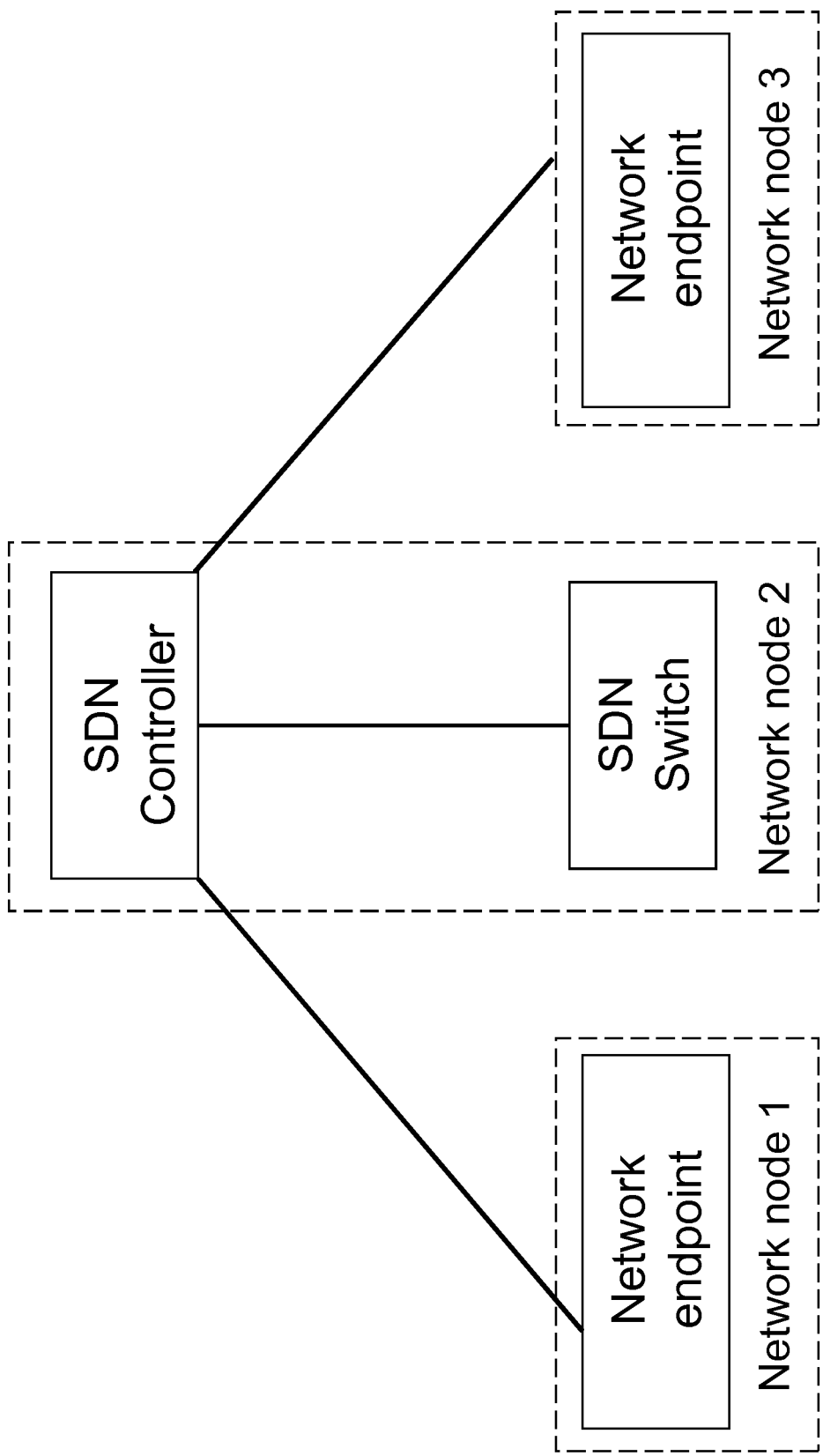
FIG. 20 is a schematic diagram illustrating an example of deployment of network entities according to yet another embodiment.

FIG. 20 is a schematic diagram illustrating an example of deployment of network entities according to yet another embodiment. In this particular example, the SDN Controller is co-located with the SDN Switch. Alternatively, the SD controller may be co-located with either of the network endpoints.

In general, a network device may be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use common off-the-shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (Nis), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device ND. In certain embodiments of such a hybrid network device, a platform Virtual Machine (VM), such as a VM that implements functionality of a special-purpose network device, could provide for para-virtualization to the hardware present in the hybrid network device.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

REFERENCES

[1] T. Dierks and E. Rescorla, "The Transport Layer Security (TLS) Protocol Version 1.2", RFC 4492, Internet Engineering Task Force, 2008.
[2] E. Rescorla and N. Modadugu, "Datagram Transport Layer Security Version 1.2", RFC 6347, Internet Engineering Task Force, 2012.
[3] E. Rescorla, "The Transport Layer Security (TLS) Protocol Version 1.3", RFC8446, Internet Engineering Task Force, 2018.
[4] E. Rescorla, H. Tschofenig and N. Modadugu, "The Datagram Transport Layer Security (DTLS) Protocol Version 1.3", draft-ietf-tls-dtls13-28 (work in progress), Internet Engineering Task Force, 2018.
[5] WO 2015/002581
[6] Microsoft internet documentation, "Create a virtual machine and install a certificate retrieved from an Azure Stack key vault", Aug. 15, 2018.
[7] US 2017/0222981

The invention claimed is:

1. A method of operating a network controller for enabling secure communication between network endpoints in a distributed network, the network controller having a secure channel with each of the network endpoints, the method comprising:
the network controller providing, in connection with establishment of a network flow for communication between the network endpoints, symmetric keying material associated with and valid only for that network flow, the providing symmetric keying material being performed in response to a trigger for initiating establishment of the network flow, the trigger being a flow setup request from a network switch being generated in response to reception of a handshake message originating from an initiating one of the network endpoints and destined for a responding one of the network endpoints; and
the network controller enabling provisioning of the symmetric keying material to the network endpoints for allowing cryptographically secure communication between the network endpoints on a per-flow basis and on demand, the communication between the endpoints performed via the network switch, the network controller responding to the network switch with flow setup information enabling the network switch to handle packet forwarding in the network flow and to forward one of the handshake message, an updated handshake message and new handshake message towards the responding one of the network endpoints.

2. The method of claim 1, wherein providing symmetric keying material comprises one of:
the network controller generating the symmetric keying material in connection with establishment of the network flow; and
the network controller selecting pre-generated symmetric keying material in connection with establishment of the network flow.

3. The method of claim 1, wherein enabling provisioning of the symmetric keying material to the network endpoints includes one of:
the network controller provisioning the symmetric keying material through the secure channels from the network controller to the network endpoints; and
the network controller provisioning the symmetric keying material to the initiating one of the network endpoints, assuming that the responding one of the network endpoints derives the symmetric keying material based on a secret shared with the network controller and a key identifier provided by the initiating one of the network endpoints or by the network controller.

4. The method of claim 1, wherein the trigger originates from one of i) the network controller, ii) one of the network endpoints and iii) a network switch responsible for handling packet forwarding for the network flow.

5. The method of claim 1, wherein the network controller generates one of the updated and new handshake message and sends the one of the updated and the new handshake message to the network switch.

6. The method of claim 5, wherein the flow setup information includes information representative of which communication that is allowed between the network endpoints over the network flow.

7. The method of claim 1, wherein the symmetric keying material comprises one of a common symmetric cryptographic key and information for deriving a symmetric cryptographic key.

8. The method of claim 7, wherein the symmetric keying material comprises a key identifier for enabling identification of the symmetric key during handshake signaling between the network endpoints for establishing the cryptographically secure communication.

9. The method of claim 1, wherein the secure communication is established based on one of a Transport Layer Security, TLS, protocol and a Datagram Transport Layer Security, DTLS, protocol.

10. The method of claim 1, wherein the distributed network is a Software Defined Network, SDN, and the network controller is an SDN controller.

11. The method of claim 1, wherein the network endpoints include a client and a server.

12. A method of operating a network switch for enabling secure communication between network endpoints in a distributed network, each of the network endpoints having a secure channel with a network controller, and the network switch having a secure control channel with the network controller, the method comprising:
the network switch sending a request to the network controller for initiating establishment of a network flow and for requesting provisioning of symmetric keying material associated with and valid only for that network flow, which step is performed in response to a handshake message from one of the network endpoints to initiate a network flow; and
the network switch receiving a flow setup response from the network controller to enable support for the symmetric keying material to be used for cryptographically secure communication between the network endpoints on a per-flow basis and on demand, the communication between the endpoints performed via the network switch; and
forwarding one of the handshake message, an updated handshake message and a new handshake message to the other one of the network endpoints based on the flow setup response to enable the network endpoints to perform handshaking to agree upon using the provisioned symmetric keying material for cryptographically secure communication between the network endpoints on a per-flow basis.

13. The method of claim 12, wherein the network switch receiving a flow setup response enables a handshaking procedure between the network endpoints to agree upon using the symmetric keying material for cryptographically secure communication between the network endpoints on a per-flow basis.

14. The method of claim 12, wherein the network switch receives the one of the updated and the new handshake message from the network controller.

15. The method of claim 13, wherein the symmetric keying material comprises a symmetric key and a key identifier for enabling identification of the symmetric key during handshaking between the network endpoints for establishing the cryptographically secure communication.

16. The method of claim 13, wherein the handshaking is performed based on one of a Transport Layer Security, TLS, protocol and a Datagram Transport Layer Security, DTLS, protocol.

17. A network controller configured to enable secure communication between network endpoints in a distributed network, the network controller having a secure channel with each of the network endpoints, the network controller being configured to:
provide, in connection with establishment of a network flow for communication between the network endpoints, symmetric keying material associated with and valid only for that network flow, the providing symmetric keying material being performed in response to a trigger for initiating establishment of the network flow, the trigger being a flow setup request from a network switch being generated in response to reception of a handshake message originating from an initiating one of the network endpoints and destined for a responding one of the network endpoints;
enable provisioning of the symmetric keying material to the network endpoints for allowing cryptographically secure communication between the network endpoints on a per-flow basis and on demand, the communication between the endpoints performed via the network switch; and
respond to the network switch with flow setup information enabling the network switch to handle packet forwarding in the network flow and to forward one of the handshake message, an updated handshake message and new handshake message towards the responding one of the network endpoints.

18. A network switch configured to enable secure communication between network endpoints in a distributed network, each of the network endpoints having a secure channel with a network controller, and the network switch having a secure control channel with the network controller, the network switch is configured to:
send a request to the network controller for initiating establishment of a network flow and for requesting provisioning of symmetric keying material associated with and valid only for that network flow, which is performed in response to a handshake message from one of the network endpoints to initiate a network flow; and
receive a flow setup response from the network controller to enable support for the symmetric keying material to be used for cryptographically secure communication between the network endpoints on a per-flow basis and on demand, the communication between the endpoints performed via the network switch, and
one of the handshake message, an updated handshake message and new handshake message to the other one of the network endpoints based on the flow setup response to enable the network endpoints to perform handshaking to agree upon using the provisioned symmetric keying material for cryptographically secure communication between the network endpoints on a per-flow basis.

* * * * *